United States Patent [19]

Fürst et al.

[11] Patent Number: 5,558,388
[45] Date of Patent: Sep. 24, 1996

[54] VEHICLE ROOF

[75] Inventors: Arpad Fürst, Germering; Martin Danzl, München; Johann Mayer, Petershausen; Stefan Miklosi, München, all of Germany

[73] Assignee: Webasto Karosseriesysteme GmbH, Germany

[21] Appl. No.: 286,467

[22] Filed: Aug. 5, 1994

Related U.S. Application Data

[63] Continuation-in-part of Ser. No. 14,991, Feb. 5, 1993, abandoned.

[30] Foreign Application Priority Data

Feb. 5, 1992 [DE] Germany ............... 42 03 229.6
Aug. 5, 1993 [DE] Germany ............... 43 26 329.1

[51] Int. Cl.⁶ ................................................ B60J 7/00
[52] U.S. Cl. .................... 296/107; 296/108; 296/117; 296/146.14; 296/216; 296/222
[58] Field of Search .................... 296/107, 108, 296/116, 117, 146.14, 146.16, 216, 222

[56] References Cited

U.S. PATENT DOCUMENTS

| | | | |
|---|---|---|---|
| 2,210,590 | 8/1940 | Jobst | 296/107 |
| 2,434,711 | 1/1948 | Mobbs et al. | 296/222 |
| 2,768,857 | 10/1956 | Albrecht | 296/117 |
| 2,957,725 | 10/1960 | Ford, II et al. | 296/107 |
| 3,146,022 | 8/1984 | Zeller | 296/116 |
| 3,536,354 | 10/1970 | Ingram | 296/146.14 |
| 4,543,747 | 10/1985 | Kaltz et al. | 296/146.14 X |
| 4,619,480 | 10/1986 | Motoyama et al. | 296/217 |
| 5,018,447 | 1/1992 | Klein et al. | 296/107 |
| 5,154,479 | 10/1992 | Sautter, Jr. | 296/121 |
| 5,195,798 | 3/1993 | Klein et al. | 296/107 |
| 5,209,544 | 5/1993 | Bennedetto et al. | 296/146.14 X |

FOREIGN PATENT DOCUMENTS

| | | | |
|---|---|---|---|
| 1488473 | 7/1967 | France. | |
| 3903358 | 8/1990 | Germany | 296/108 |
| 3930343 | 3/1991 | Germany | 296/107 |
| 0261527 | 11/1987 | Japan | 296/216 |
| 0015923 | 4/1990 | Japan | 296/216 |
| 4056628 | 2/1992 | Japan | 296/216 |
| 1181875 | 5/1966 | United Kingdom. | |

OTHER PUBLICATIONS

Automotive Industries, Feb. 1990, p. 75, "C & C Intrigue".

*Primary Examiner*—Dennis H. Pedder
*Attorney, Agent, or Firm*—Sixbey, Friedman, Leedom & Ferguson, P.C.; David S. Safran

[57] ABSTRACT

The invention relates to a vehicle roof with at least one roof cover part that can be opened during driving. This roof part can be moved into at least one open position in the manner of a conventional sliding-lifting roof on roof parts lying laterally to it or on guideways arranged on it in lengthwise direction of the vehicle. Furthermore, after complete opening of the roof part that can be opened, the roof as a whole is able to be placed in a lengthwise compacted configuration and then lowered into a stowage space behind the passenger compartment, whereby the vehicle becomes a fully open convertible-type vehicle without substantially consuming the usually available trunk space. In one set of embodiments, the compacted roof configuration is stored in a vertical orientation. In another embodiment, the compacted roof package is stowed under a rear window, and then the complete package of rear roof part and rear window lowered by retracting the B-columns supporting the rear roof part into a storage space between seats and rear axle.

32 Claims, 35 Drawing Sheets

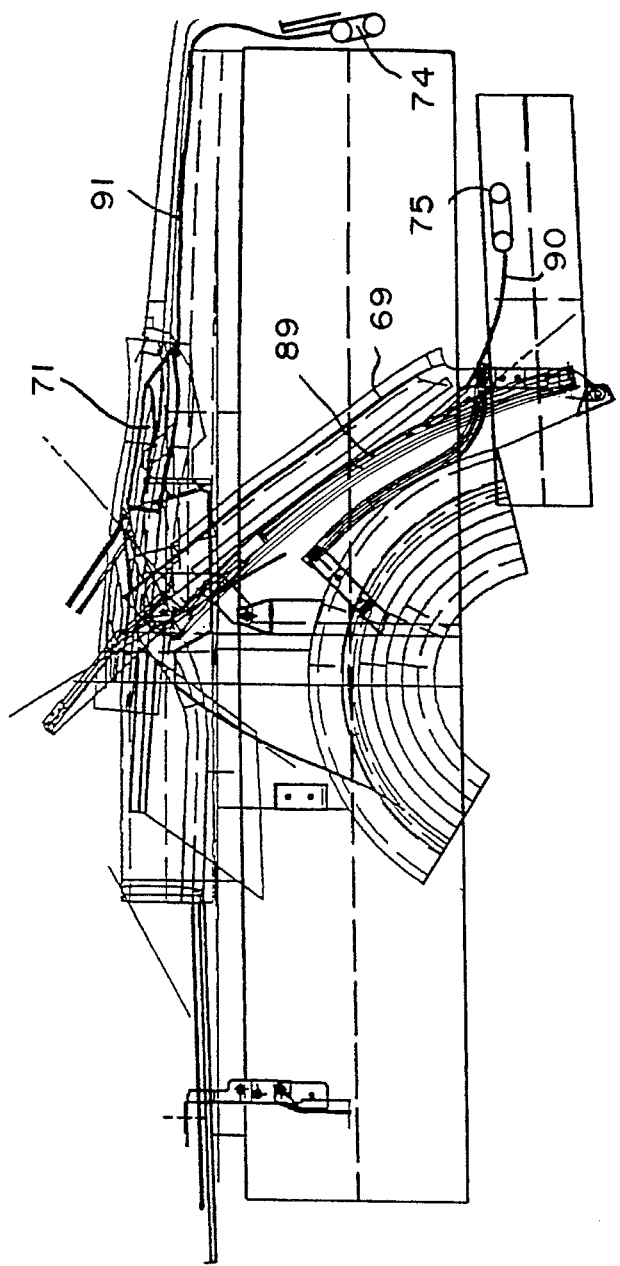
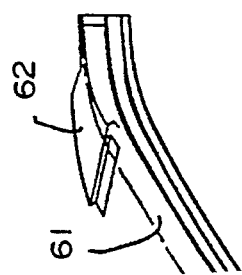
FIG. 24B

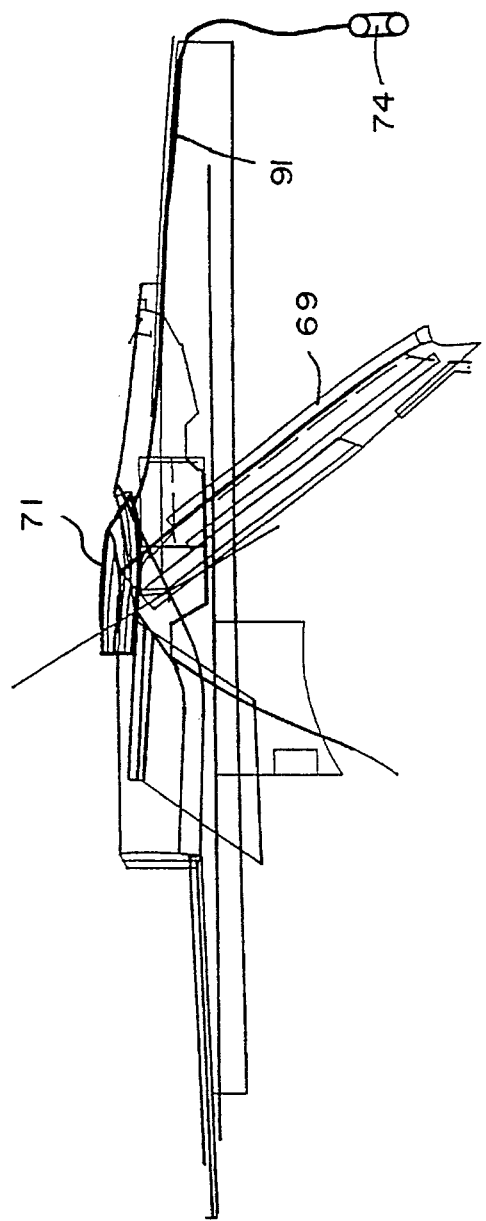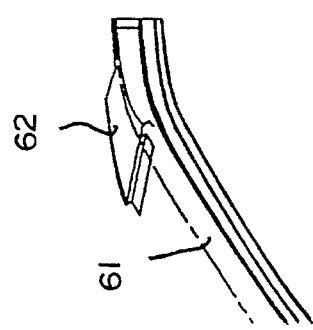
FIG. 25

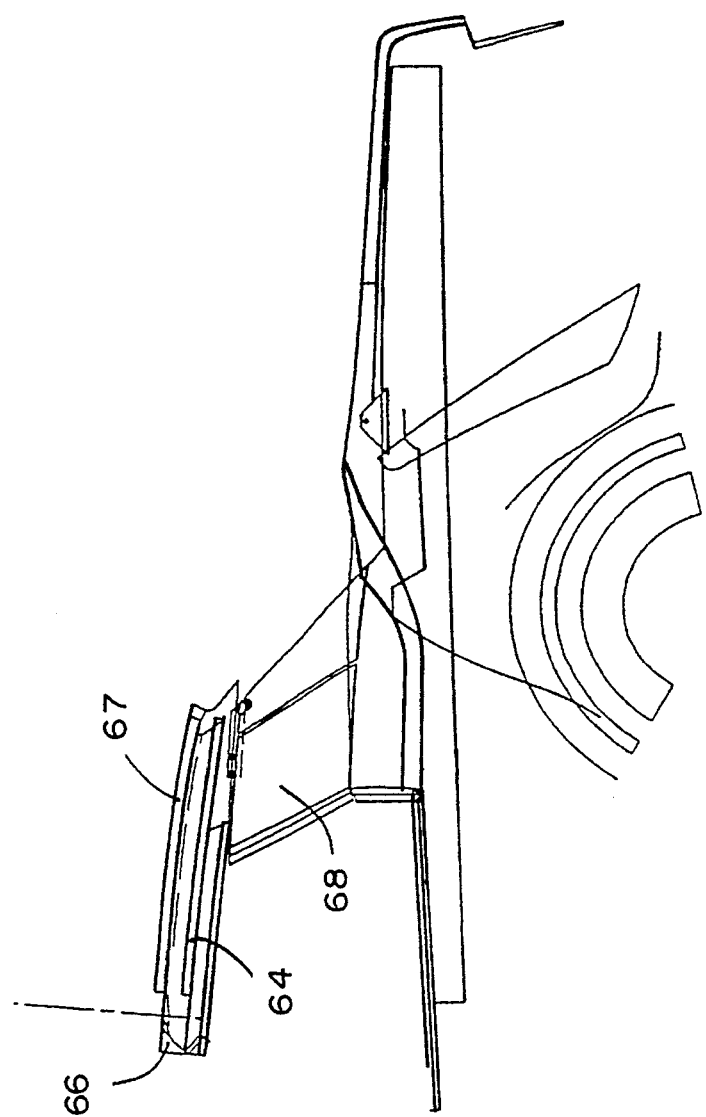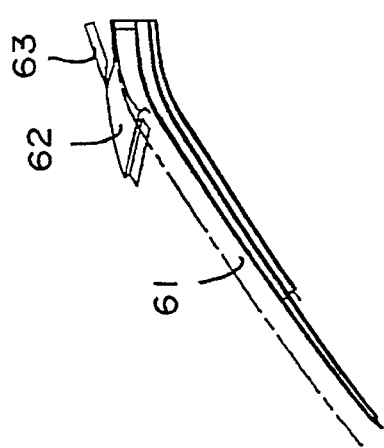
FIG. 30

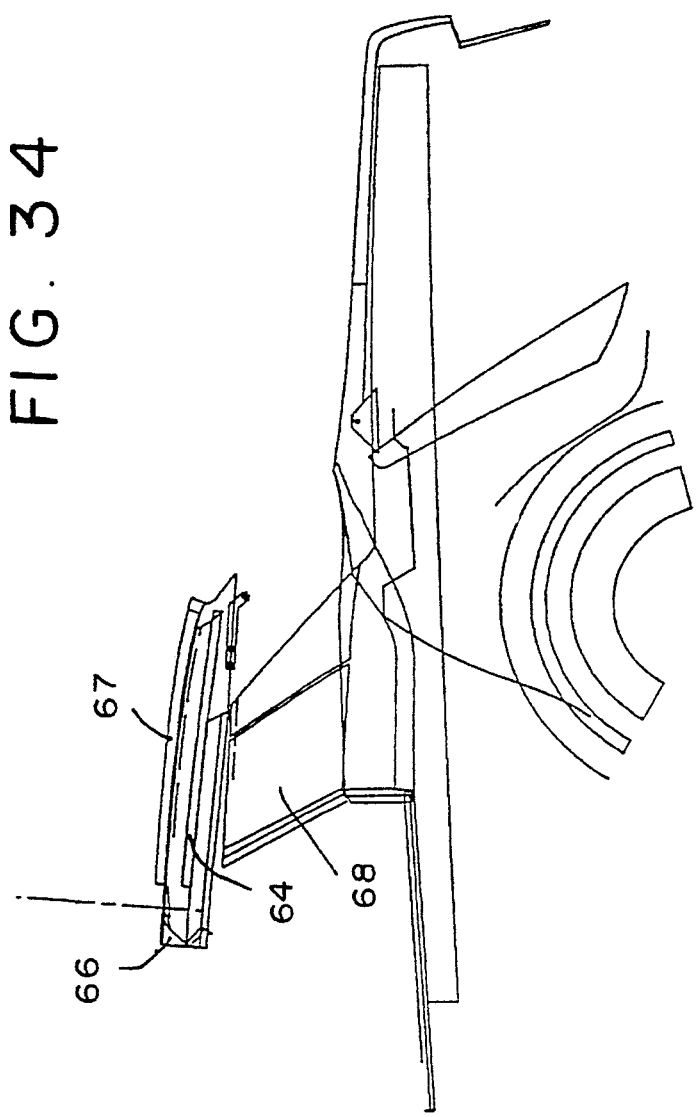
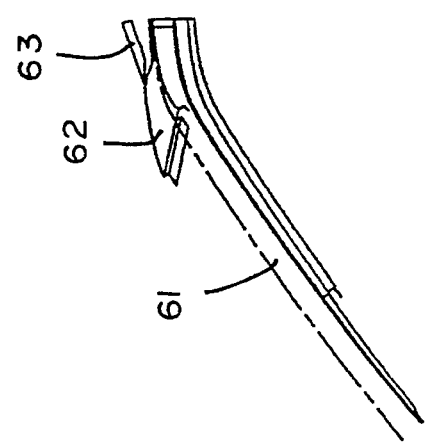
FIG. 34

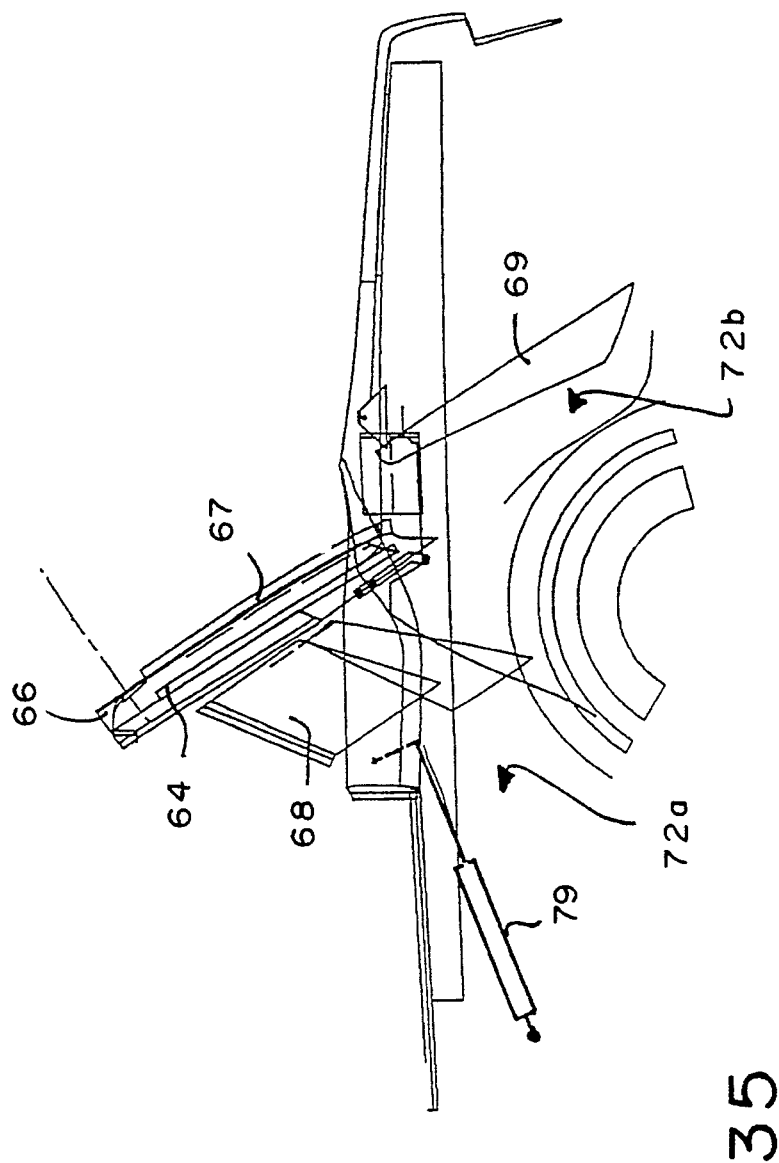
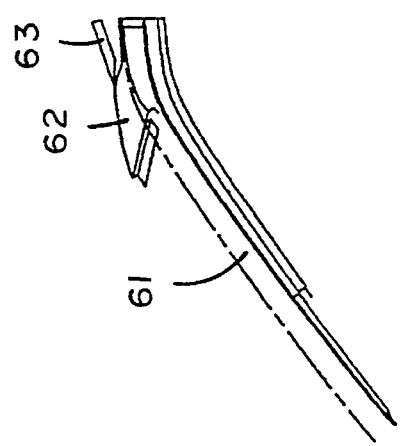
FIG. 35

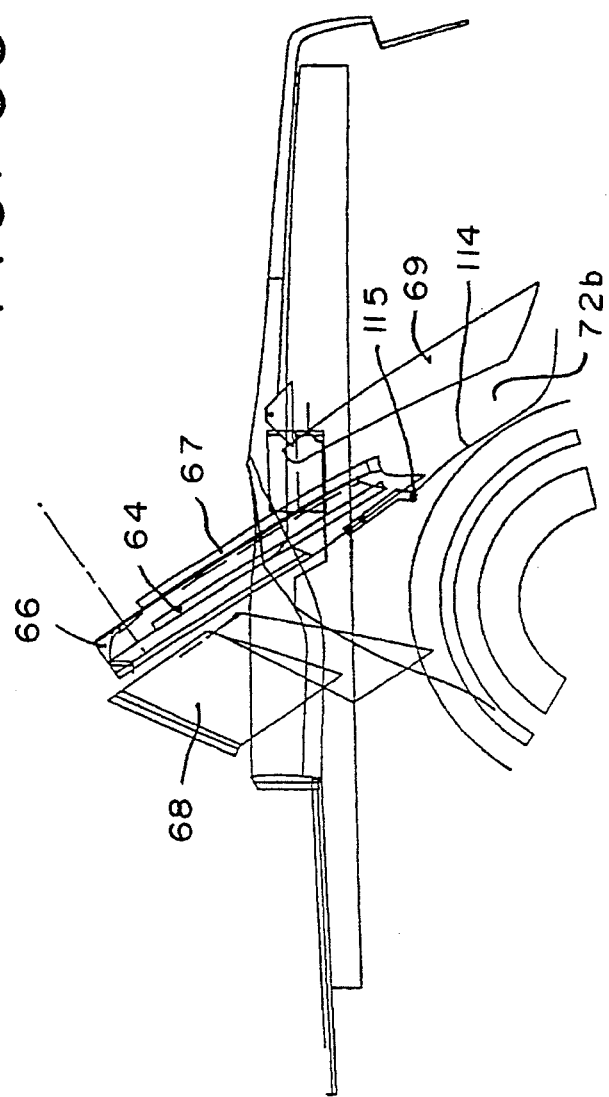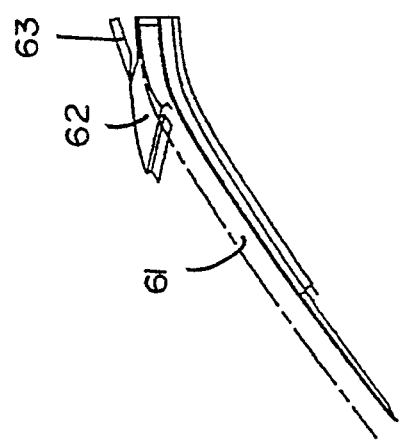

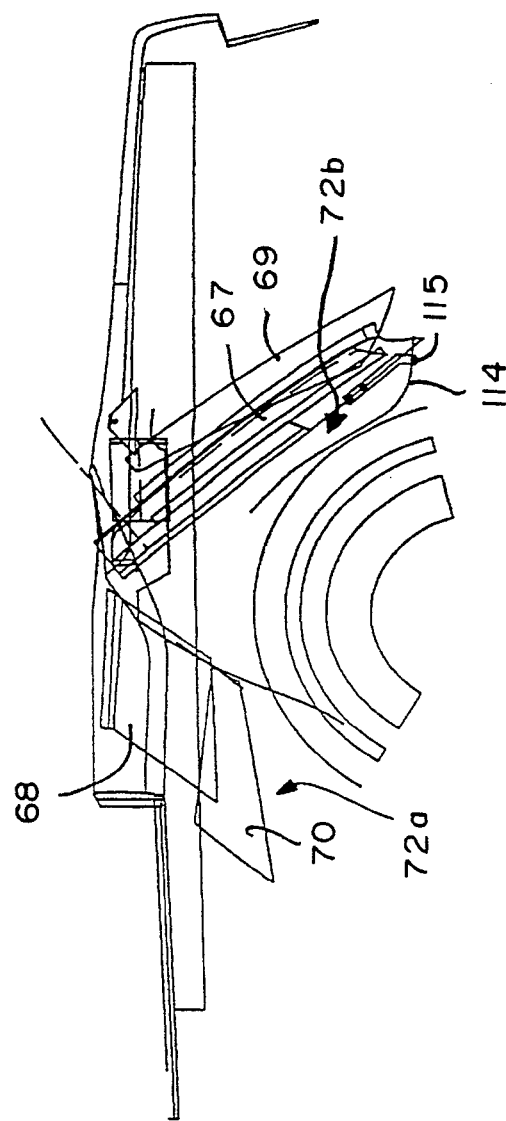
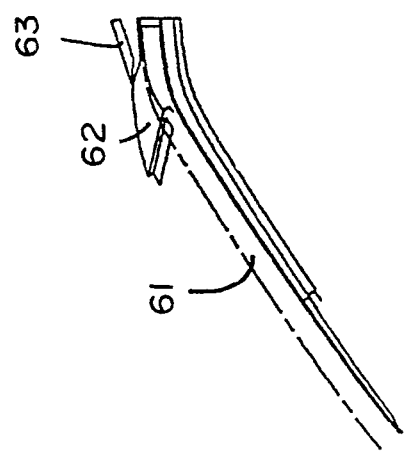
FIG. 37

VEHICLE ROOF

CROSS REFERENCE TO RELATED APPLICATION

This application is a continuation-in-part of commonly owned U.S. patent application Ser. No. 08/014,991, filed Feb. 5, 1993, now abandoned.

BACKGROUND OF THE INVENTION

1. Field of the Inaction

The invention relates to a vehicle roof with at least one roof part that can be opened during driving in the manner of a sunroof and which can also be opened in the manner of a convertible with the roof parts being shifted into a compact form and moved into a storage space in the rear part of the vehicle.

2. Description of Related Art

Vehicle roofs with roof parts that are able to open during travel are known in numerous embodiments, such as, for example, as sliding roofs, lifting roofs, sliding-lifting roofs, spoiler roofs, segmented roofs or folding roofs. Common to all of these roof types is that they are installed in a rigid vehicle roof, and thus, are surrounded on at least three sides by a rear roof part and two side roof parts which have guideways. These roofs have the advantage that they exhibit high stability even when open. But, the size of the achievable roof openings is limited and does not nearly approach the size of known convertible roofs, in which a cover made of flexible material can be folded back by a mechanism to make possible a complete opening of the roof. These convertible roofs, in turn, have the drawbacks that they can only be completely opened or completely closed, i.e., it is not possible to leave them in an intermediate position, that they generally cannot be moved during travel and that, in the closed state, especially under unfavorable storm or winter conditions, they do not offer the travelling comfort or, above all, the safety, of a closed sedan.

Also known is a so-called hardtop convertible, of the type that was found for a short period of time on Ford Motor Company products, in which the entire roof was movable, in a single rigid piece, from a position sitting on the body of the car to a position stowed within the vehicle trunk. However, with the roof in its stowed condition, the vehicle trunk became unusable for carrying luggage and the like. Other examples of hardtop convertibles can be found in U.S. Pat. Nos. 5,195,798 and 5,078,447 as well as UK Patent No. 1,181,875 and Japanese Patent Publication 4-56628. However, in all of these cases, the entire one-piece roof panel is stowed in an uncompacted form, resulting in either the loss of usable trunk space, or in the case of U.S. Pat. Nos. 5,195,798 (where the roof is stowed in a vertical orientation), the necessity of the vehicle being stationary during the conversion process.

SUMMARY OF THE INVENTION

The primary object of the present invention is, thus, to provide a vehicle roof that, in the closed state, offers the advantages of a sedan and, during travel, in several intermediate stages, makes possible a widening roof opening, up to a completely open state.

It is a further object of the present invention to achieve the foregoing object without destroying the utility of the vehicle trunk for carrying luggage or the like.

In keeping with the foregoing objects, additional objects lie in providing a vehicle roof which, when converted from a sedan into a fully open convertible is in a compacted configuration in which the roof panel is lengthwise reduced in size to require less space when stowed and to offer less wind resistance while being stowed.

These objects are achieved by making the openable roof part, the side and the rear roof parts all movable into a stowage space in the rear part of the vehicle (such as a portion of the vehicle trunk), without retaining the rigid configuration of the roof as a whole in its closed condition, to create a convertible-like roof opening.

The openable roof part can involve a roof with at least one rigid cover, such as a sliding roof, lifting roof, sliding-lifting roof or spoiler roof, in which, by various cover positions, roof openings of various sizes can be achieved in a known way.

It is advantageous, especially in vehicles with more than two seats, to have an embodiment with two rigid covers, since here the individual cover becomes shorter and both covers can consequently be accommodated more easily under the rear roof part and/or in the stowage space. When using rigid covers, a vehicle roof consisting only of rigid parts can be made, which makes possible a complete roof opening without using flexible material (fabric).

On the other hand, the use of a folding roof is possible, which in and of itself is accompanied by the advantage of a large roof opening with a small stowage space for the folding top.

For the stability of the roof, it is advantageous if the rear roof part forms a roll bar together with side supporting pillars (C-pillars).

It is advantageous for an intermediate position with opened roof parts if the rear roof part forms a receptacle for the openable roof part(s).

An especially space-saving stowage of the roof is made possible in that a rear window on the rear roof part is detachable and can be lowered by a separate mechanism into the stowage space.

To increase stability, it is further advantageous if the side roof parts are detachably arrested on a transverse support running above the front windshield. In this way, when openable roof parts are moved rearward, but the side and rear roof parts are still in the original position, a great stability of the then vertical body cage is achieved, and simultaneously, it is made possible to completely move the side roof parts away to the rear.

Especially for visual reasons, it is advantageous if the side roof parts, after movement of the openable roof part(s), can be pivoted on the rear roof part. They are thus, after moving the side roof parts into the stowage space with the rear roof part, completely hidden. While it is also possible to fold the side parts onto the front transverse spar when the roof is completely opened, such would still allow the adjacent side roof parts to be seen extending crosswise to the direction of vehicle travel.

The stowage room advantageously has a cover that can be moved by a motor and that, before lowering the rear window, can be moved in the opening direction and, after swiveling the rear roof part into the stowage space, can be moved in the closing direction. Thus, with a completely opened roof, an appearance comparable to that of a real convertible is achieved.

Advantageously, a pivotable wind deflector segment that can be pivoted out, when the roof is opened at least partially, is placed on a transverse support located above the front windshield. This wind deflector can, in its basic, stored state, lie in a sealing fashion next to the openable roof part. With such a separately pivotable wind deflector segment, a first, minimal ventilation position can be achieved even when the openable roof part is still essentially closed. To reduce the acting wind forces, it is especially advantageous if the wind deflector segment can be pivoted out, at least during the movement of the openable roof part and/or the swiveling of the rear roof part, into a second position that is steeper relative to the first position.

An advantageous modification for lowering the entire roof consists in that the rear roof part, together with the supporting pillars (C-pillars), can be swiveled into the stowage space after lowering the rear window and after the rear roof part has received the openable roof part and the side roof parts also have been folded onto the rear roof part.

In another embodiment, the openable roof part, after lowering the rear window into the stowage space, is moved separately into the stowage space. In this way, an intermediate position results in which a kind of roll cage, consisting of the C-pillars, the rear roof part and the side roof parts, first remains still and then, in another step, can be separately stowed.

An additional object of this invention is to install the lateral roof parts in the rear roof part in a simpler and more space-saving way than has previously been possible.

This additional object is achieved via an embodiment in which the lateral roof parts, after complete opening of the movable roof cover part, can be telescopically retracted into the rear roof part that is stationary during the sunroof mode of operation. Such a retracting of the lateral roof parts can take place by a simple linear drive without limiting the headroom of the passengers.

An advantageous further development of the invention provides that the rear roof part can be moved under the rear window. Additionally, the upper edge of the rear window can be raised before the retracting of the rear roof part. But, as an alternative to this, a lowering of the rear roof part over the B-columns supporting the rear roof part can also take place. For a complete lowering of the rear roof part with the opened roof cover part and the telescopically retracted lateral roof parts as well as the rear window, it is advantageous if the B-columns supporting the rear roof part can be lowered into a storage space in front of the rear axle of the vehicle.

After the lowering, the rear window can be used, in an advantageous variant, directly as a coveting of this storage space. As an alternative to using the rear window as a cover, a separate coveting can be arranged in the storage space which is used to cover the rear window toward the rear.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 24A and 24B schematically depict lowering of the rear window;

FIG. 25 schematically depicts stowage of the rear window;

FIGS. 29 and 30 depict intermediate phases in the process of storing the normally fixed roof parts;

FIGS. 34–37 depict the swinging of the C-pillars and roof unit into their stowage position;

DETAILED DESCRIPTION OF THE PREFERRED EMBODIMENT

Figure 1:
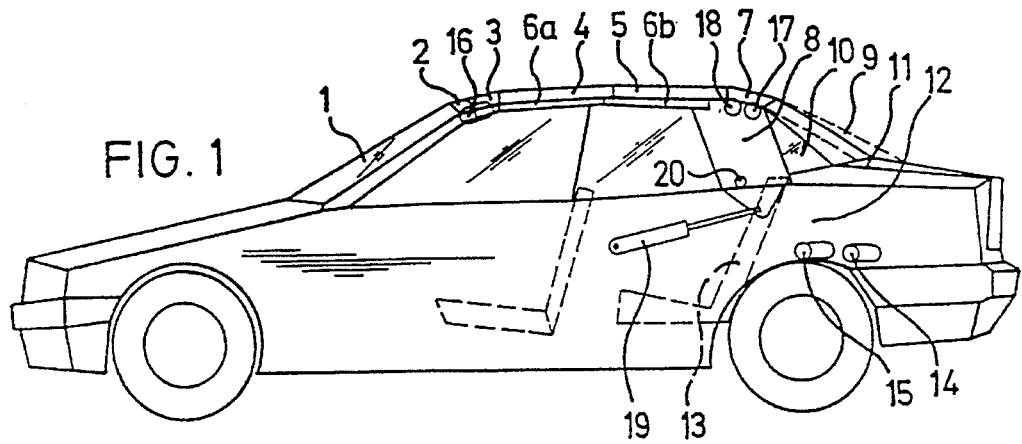
FIGS. 1–9 show a two-cover roof in several opening phases.

In FIGS. 1–9, a sedan equipped with two rows of seats, a front windshield 1 and a forward transverse support 2 extending above the front windshield 1 is shown. The roof of this sedan comprises a wind deflector segment 3 attached to transverse support 2 and mounted to pivot, a forward cover 4 attached to wind deflector segment 3, a rear cover 5 attached to front cover 4 and a rear roof part 7. At each later side of the covers 4 and 5 there are side roof parts 6*a*, 6*b* that guide the covers in guide rails. Side roof parts 6*a* and 6*b* are mounted to pivot on rear roof part 7 and are detachably connected to forward transverse support 2. At each lateral side the rear roof part 7 rests on a C-pillar 8 which is connected to the lower part of the vehicle body. In this embodiment, the rear roof part 7 and both C-pillars 8 form a roll bar.

A rear window 9 has a top edge which adjoins the rear roof part 7 and is connected to it in a sealing fashion.

Triangular windows 10 are supported on the C-pillars to be inwardly foldable, and are placed on each side of the roof between a C-pillar 8, rear roof part 7 and rear window 9 as described below relative to equivalent window 70 in connection with FIG. 19.

A stowage space 12 that is for receiving the entire roof and that can be covered by a cover 11 is provided behind a rear bench seat 13.

To move cover 11 in the opening direction before the forward pivoting and subsequent lowering of rear window 9, and in the closing direction after moving covers 4 and 5 and swiveling the roll bar into stowage space 12 in the closing direction, an electric drive 14 is provided in the area of stowage space 12.

Figure 24A:
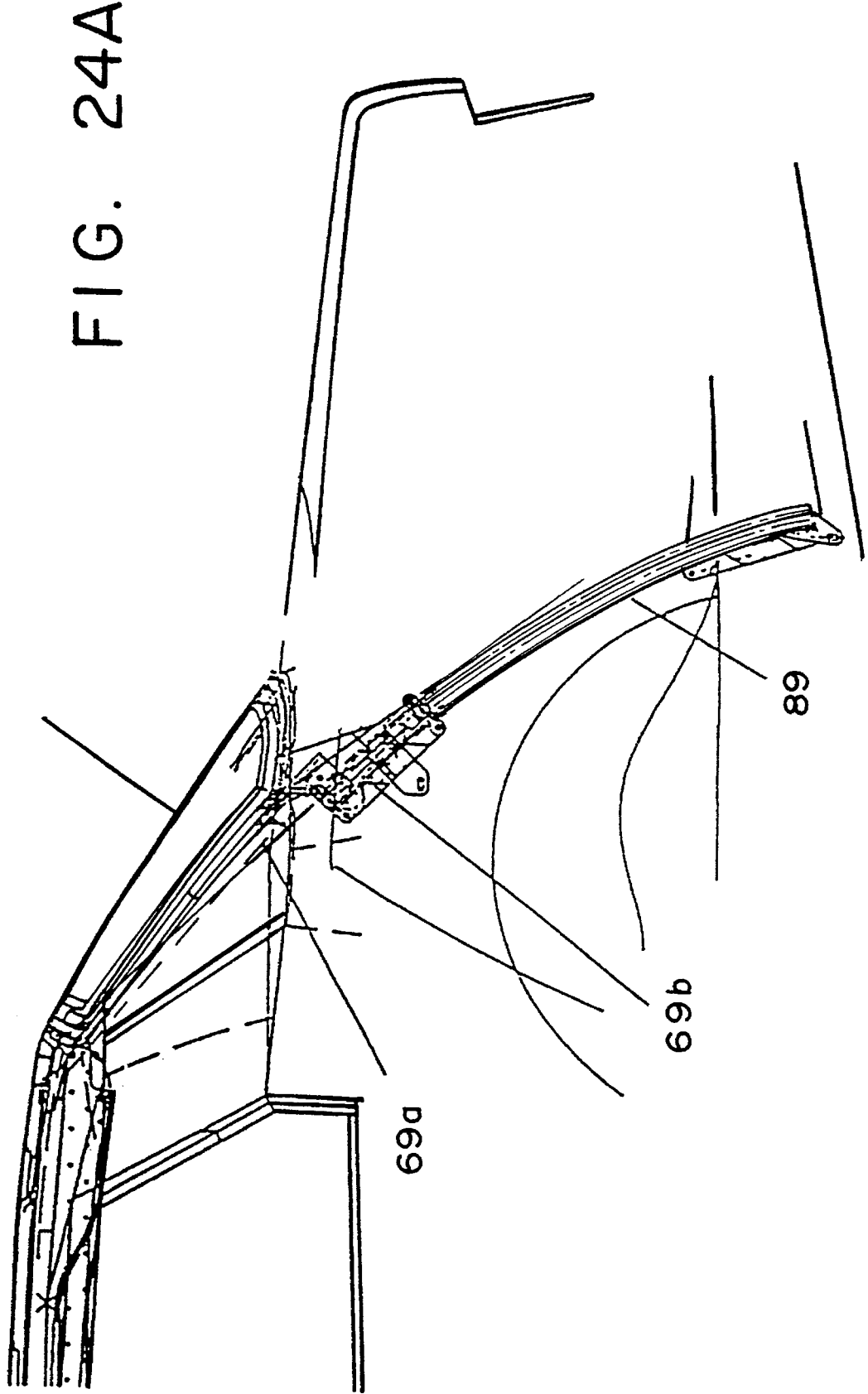

Another electric drive 15, which also is placed in the area of stowage space 12, provides for pivoting rear window 9 around its top edge toward C-pillar 8 and for the subsequent movement into stowage space 12 behind rear bench seat 13 as described below relative to equivalent window 69 in connection with FIGS. 24A and 24B. In forward transverse support 2, an electric drive 16 is provided that effects the pivoting out of wind deflector segment 3, and preferably also, the release of side roof parts 6a, 6b from forward transverse support 2 as described below relative to equivalent window deflector 62 in connection with FIG. 20 and relative to equivalent side parts 66 in connection with FIG. 28.

In rear roof part 7, an electric drive 17 for moving covers 4 and 5 is provided, as is an electric drive 18 for producing a pivoting movement of side roof parts 6a, 6b. Two hydraulic cylinders 19 are placed in the area of the rear vehicle side walls to produce a pivoting of C-pillars 8 with rear roof part 7, along with side roof parts 6a, 6b when they are folded onto the rear roof part, around a fulcrum 20 that lies about at the height of the waist line of the vehicle. Such pivoting unit is essentially a heavy-duty version of the type of drive unit already in used for swinging conventional cloth folding-type convertible roof tops.

While the vehicle roof in FIG. 1, in the completely closed state, does not differ from that of a conventional sedan, the intermediate stages represented in FIGS. 2–9 show its gradual change into a vehicle like a conventional convertible. But by using rigid covers, the entire roof is formed, unlike a convertible, exclusively of rigid parts; this has great advantages with respect to safety, resistance to storms and the lifetime of the roof, as well as with respect to ease of repair, since all elements can be individually replaced, in contrast to a continuous fabric cover.

Figure 2:
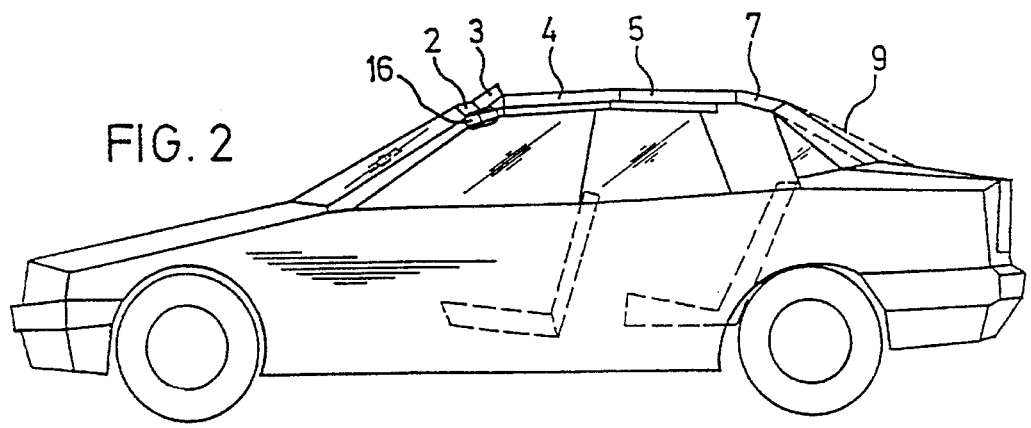

In FIG. 2, wind deflector segment 3 is first pivoted out by drive 16. It thus opens a first, relatively small ventilation opening. The pivoting out of wind deflector segment 3 is performed, preferably, to achieve a first ventilation position with a shallow slant.

Figure 3:
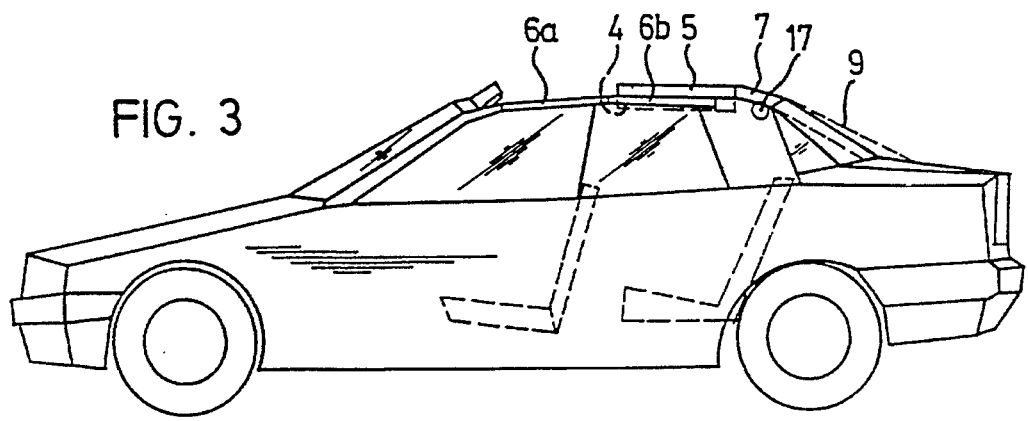

In FIG. 3, front cover 4 is moved rearward by drive 17, in addition to wind deflector segment 3 having been pivoted out. In this condition, the front cover 4 lies under rear cover 5. Thus, a roof opening is created that resembles that of a conventional sliding roof.

Figure 4:
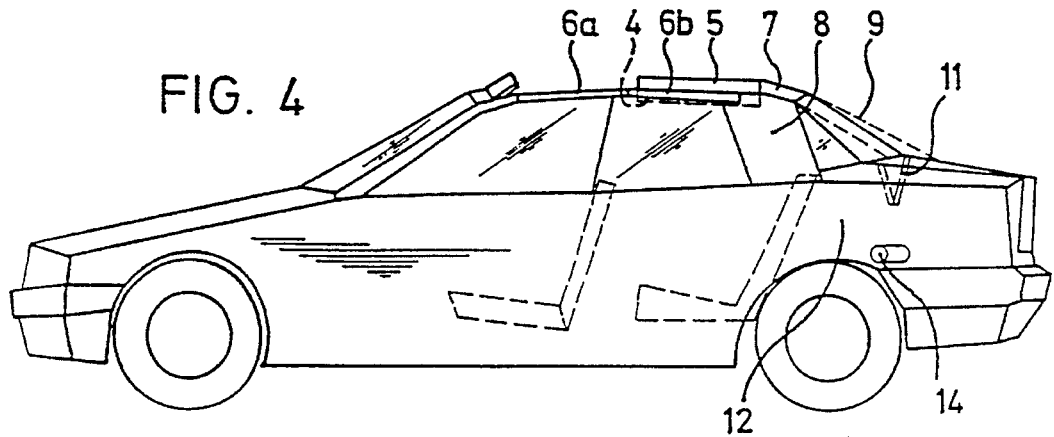

In FIG. 4, by drive 14, cover 11 of stowage space 12 is opened by a rearward folding movement. Stowage space 12 corresponds, generally, to the area under the shelf normally found directly behind the rear seat, and may be open to or separated from the remainder of the usual trunk of the vehicle.

Figure 5:
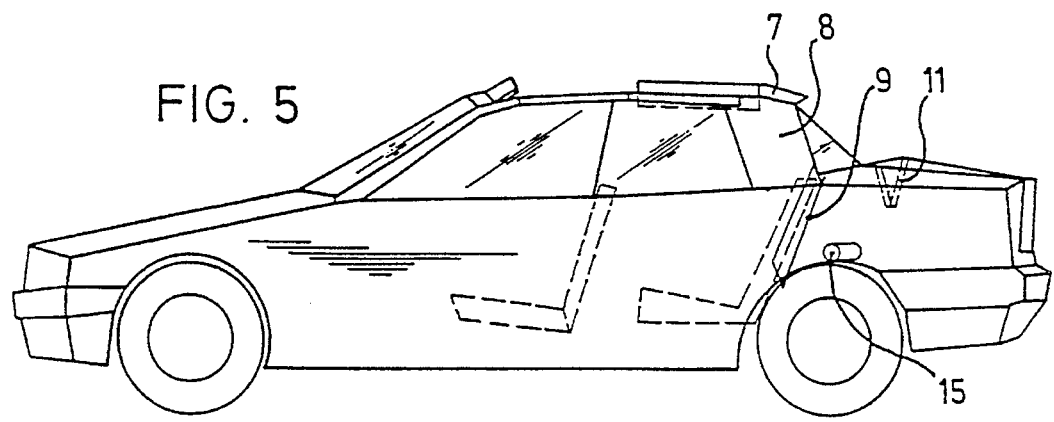

To reach the state represented in FIG. 5, rear window 9 is first swung forward by drive 15 around its top edge in the travel direction, and is then moved, about parallel to the backrest of rear bench seat 13, into stowage space 12. Also, in this intermediate stage, as in the preceding and following stages, normal driving is possible with an already considerably improved ventilation effect.

Figure 6:
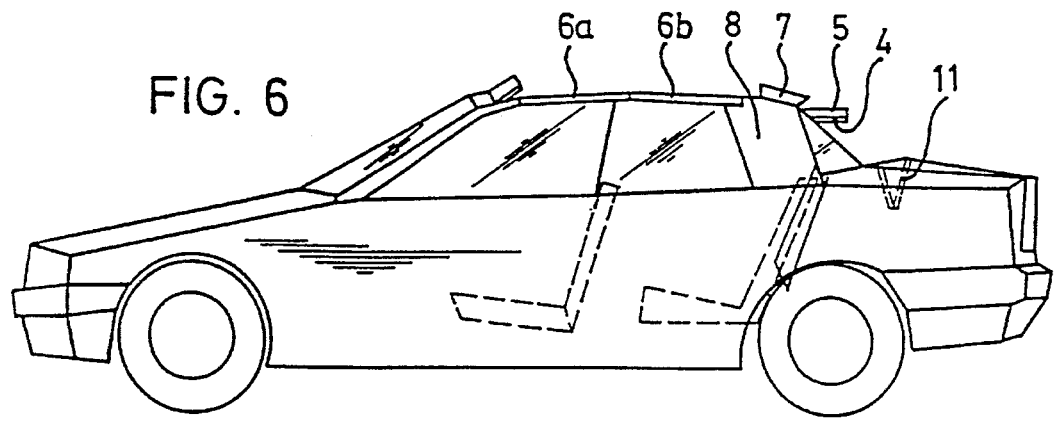

In FIG. 6, forward cover 4 under rear cover 5 has been moved by drive 17 in superposed position under rear roof part 7 which, for this purpose, has a suitable receptacle. Up to this stage, a stable roll cage consisting of C-pillars 8, rear roof part 7 and side roof parts 6a and 6b, still connected to front transverse support 2, has been kept in place.

Figure 7:
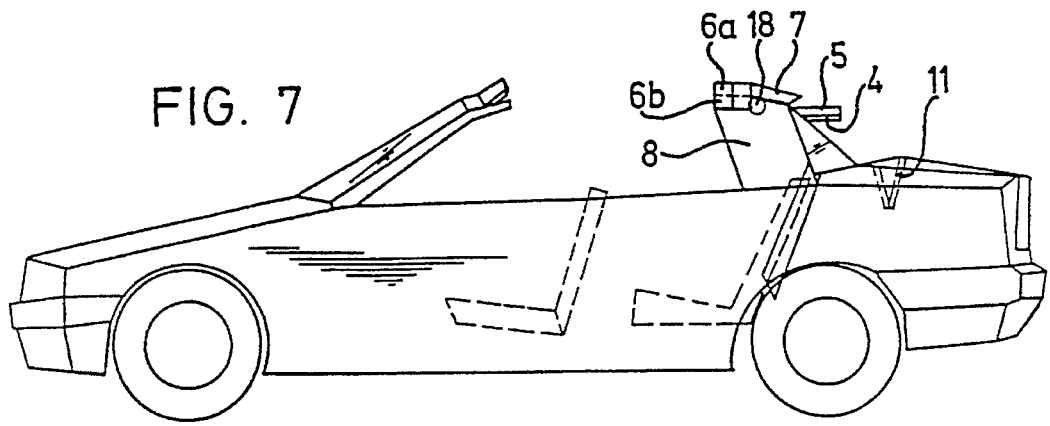

To reach the state shown in FIG. 7 from the representation in FIG. 6, the connections between forward transverse support 2 and forward side roof parts 6a are broken by drive 16, then side roof part 6a is folded inward toward side roof part 6b, and then roof part 6b, with roof part 6a adjacent thereto, is folded onto rear roof part 7. These movements are performed by drive 18, which is located in the area of rear roof part 7.

Figure 8:
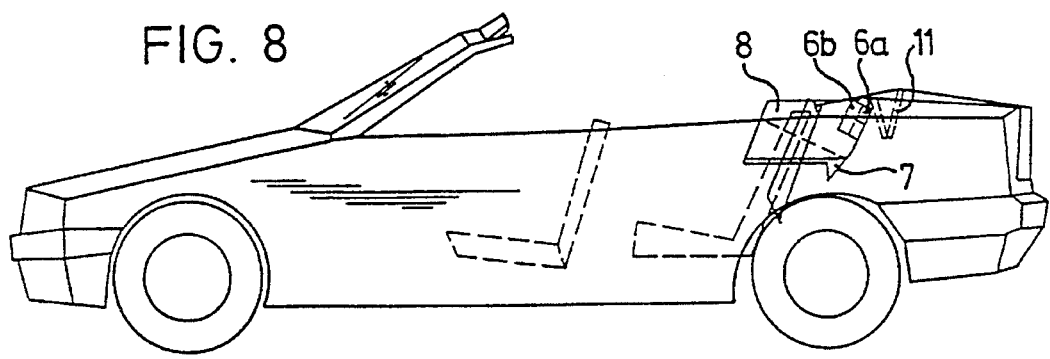
Figure 9:
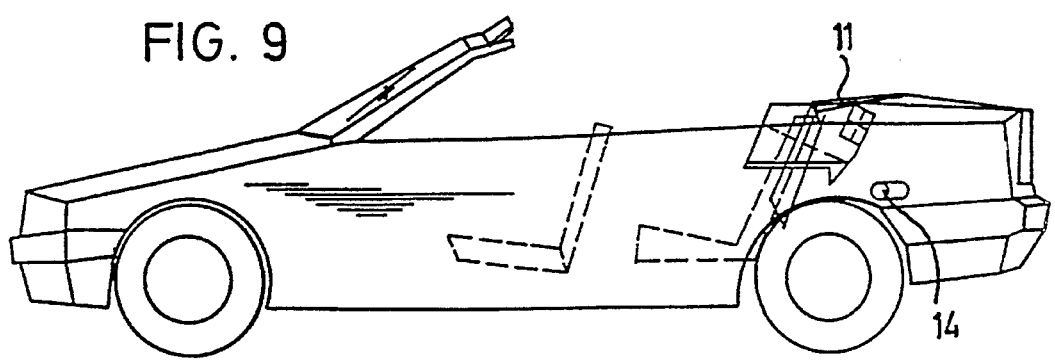

Next, by hydraulic cylinder 19, represented in FIG. 1, the entire unit of C-pillars 8, rear roof part 7 and covers 4 and 5, held underneath the latter, are pivoted around fulcrum 20 into stowage space 12. This state is represented in FIG. 8. After closing cover 11 by drive 14 (FIG. 9), in a manner comparable to that described below in connection with FIGS. 24 & 25 and corresponding cover 71, the roof is completely hidden from view, accommodated in stowage space 12. As a result, the vehicle appears to the observer like a conventional convertible.

In the second embodiment, represented in FIGS. 10–13, a two-seater sports vehicle is represented in which, because of the shorter roof, only one cover is provided. The roof part comprises, working rearwardly from front windshield 21 and a forward transverse support 22 placed above the latter, of a wind deflector segment 23 mounted to pivot on forward transverse support 22, a cover 24 attached to the wind deflector segment and a rear roof part 27. Cover 24 is bounded at its lateral sides by side roof parts 26 that are mounted to pivot on rear roof part 27 and are detachably held on forward transverse support 22. Rear roof part 27 forms, with supporting C-pillars 28, a roll bar. A rear window 29 is attached, in the rear, to rear roof part 27. Between the rear window and the C-pillars 28, a triangular window 30 is provided on both sides. A cover 31 (FIG. 11) opens a stowage space 32 located behind seat 33 to receive the entire roof.

Figure 10:
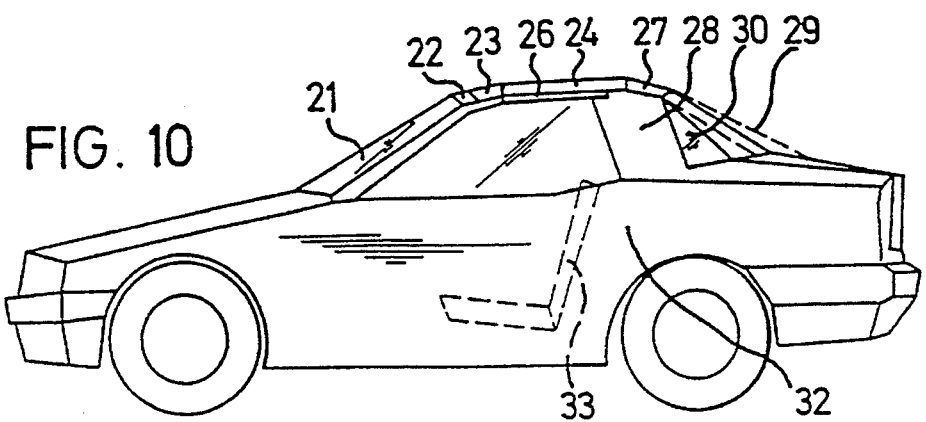
FIGS. 10–13 show a one-cover roof in a two-seater sports vehicle in several movement phases.
Figure 11:
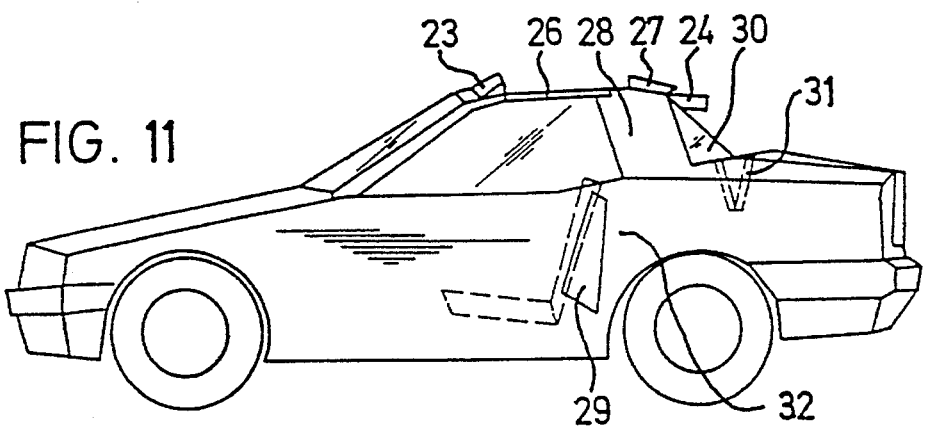

The course of movement is similar to that of the first embodiment. In FIG. 10, the roof is completely closed. In FIG. 11, in two independent partial steps, wind deflector segment 23 has been pivoted out by a drive (not represented in this figure but corresponding to 16 in FIG. 1 ), located in the area of forward transverse support 22 and cover 24 is moved to the rear under rear roof part 27, by a drive (not represented in this figure but corresponding to 17 in FIG. 1), located in the area of rear roof part 27. Before this, rear window 29 was pivoted, by a drive, (not represented in this figure but corresponding to 15 in FIG. 1), located in the area of stowage space 32, first around its top edge in the direction of C-pillars 28 and then, moved parallel to the backrest of seat 33, into stowage space 32. In this intermediate position, a very good ventilation effect is achieved and a closed roll cage is present that is formed by C-pillars 28, rear roof part 27, and side roof parts 26 which are still engaged in the forward transverse strut 22.

Figure 12:
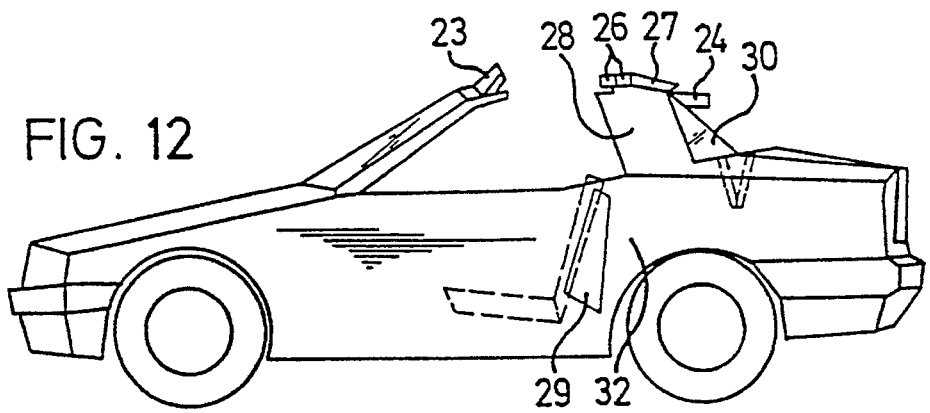
Figure 13:
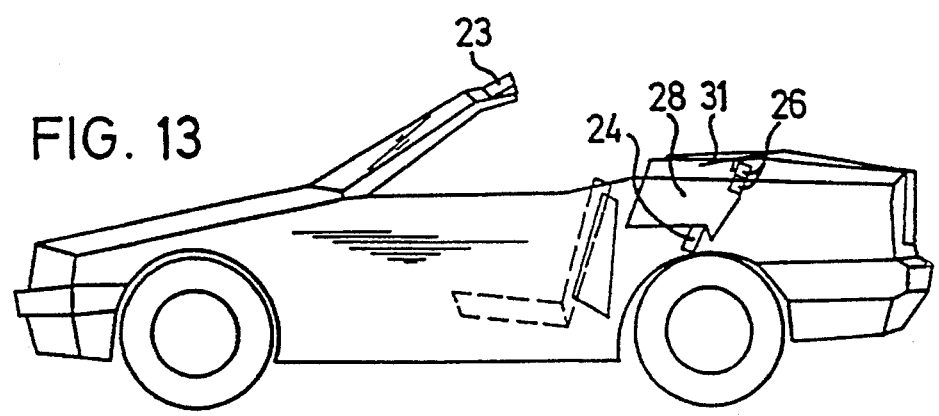

In FIG. 12, wind deflector segment 23 is pivoted out into a second position that is steeper relative to the first one shown in FIG. 11. The drive motor placed in the area of forward transverse support 22 has released the arrest of side roof parts 26 with forward transverse support 22 and a drive motor (not represented in this figure but corresponding to 18 in FIG. 1) located in the area of rear roof part 27 has pivoted side roof parts 26 onto rear roof part 27.

The steep angle of wind deflector segment 23 causes, during the folding of side roof parts 26 onto rear roof part 27 and during the subsequent swiveling of the roll bar along with side roof parts 26 and cover 24 into the stowage space, a reduction of the wind forces acting on the rear roof part. After finishing the swiveling movement of the entire unit into the stowage space, the wind deflector segment 23 is, preferably, moved back into its first pivoted position. But preferably, wind deflector segment 23 remains adjustable even when the roof is completely opened, to make it possible for the vehicle occupants, depending on their individual needs, to adapt it effects to the wind conditions and the vehicle speed. Further, as represented in FIG. 13, cover 31 is again closed by a drive motor, not represented, so that, here also, the visual impression of a convertible results.

The third embodiment, represented in FIGS. 14–17, differs from the first embodiment in that both openable roof parts (covers) are moved separately into a stowage space after moving the rear window into the stowage space, and only afterward is a combination of the side roof parts, rear roof part and C-pillars broken up and also stowed in the stowage space. The reference numbers are, as far as possible, similar to those in FIGS. 1–9, only being increased by 40.

Figure 14:
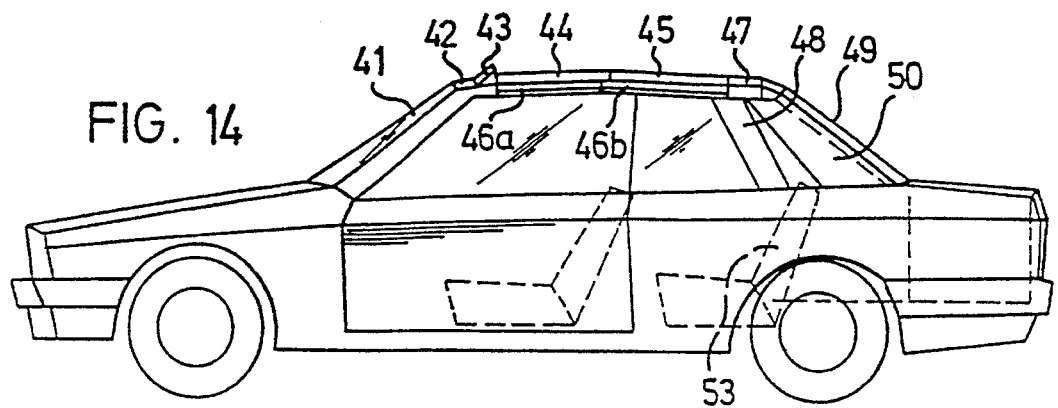
FIGS. 14–17 show a modified form of the embodiment of FIGS. 1–9 in which the openable roof parts can first be moved separately into the stowage space.

In FIG. 14, first, a wind deflector segment 43, which is mounted to pivot on a forward transverse support 42 that is located above a front windshield 41, is pivoted out into a ventilation position by a drive located in the area of forward transverse support 42 (not represented in this figure but corresponding to 16 in FIG. 1). A front cover 44 and a rear cover 45 behind it are still closed and form, with side roof parts 46a, 46b that guide them, and with a rear roof part 47, a closed roof panel as in a sedan. Rear roof part 47 forms, with side C-pillars 48 that support rear roof part 47, a roll bar.

Figure 15:
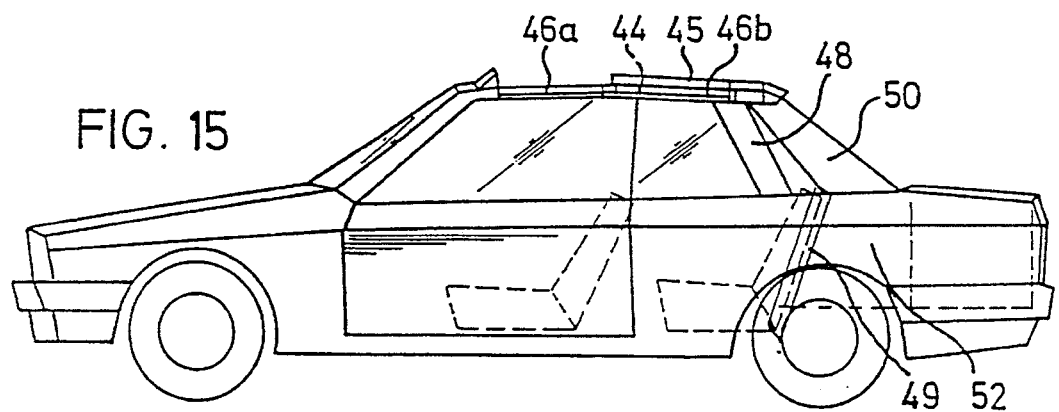
Figure 16:
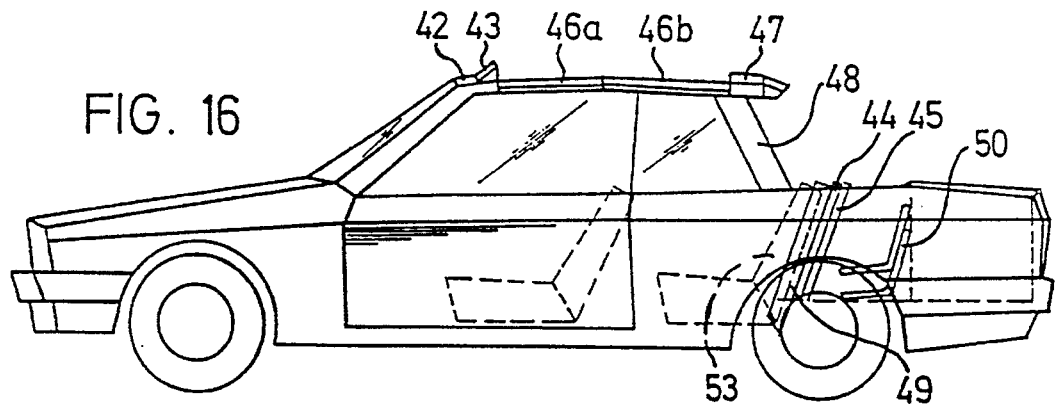
Figure 17:
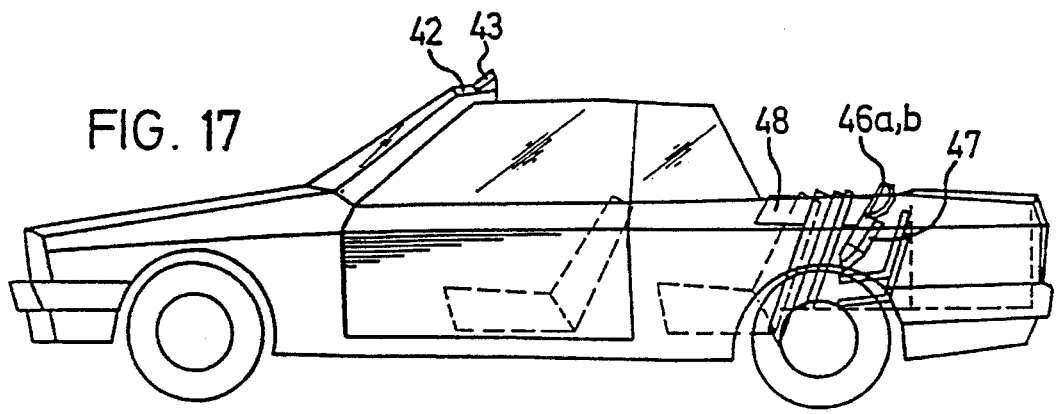

In FIG. 15, rear window 49, attached in the rear to rear roof part 47, is swung forward around its top edge and then moved into a stowage space 52 behind rear bench seat 53. Additionally, forward cover 44 is moved back into a position under rear cover 45 by a drive located in the area of rear roof part 47 (not represented in this figure but corresponding to 18 in FIG. 1). Then, both covers 44, 45 are moved into stowage space 52 by a link (not represented) placed on C-pillars 48, and side parts 50, located between rear window 49 and C-pillars 48, are folded up and stowed in the stowage space (FIG. 16). At this stage, a closed roll cage is formed by C-pillars 48, rear roof part 47 and side roof parts 46a and 46b, and all other upper and rear parts of the car interior that impede a ventilation effect are already in stowage space 52.

In the next step, by a drive motor located in the area of rear roof part 47 (not represented in this figure but corresponding to 18 in FIG. 1), side roof part 46a is folded onto side roof part 46b and then both side roof parts 46a, 46b are folded onto rear roof part 47. Now by a hydraulic cylinder (not represented in this figure, but corresponding to 19 in FIG. 1) placed on both sides the unit consisting of C-pillars 48, rear roof part 47 and side roof parts 46a, 46b folded onto the latter are swiveled into stowage space 52.

In a fourth embodiment, several variations are indicated compared to the three previously described ones as well as specifics of components (such as the wind deflector mechanism, detachable side part interlock, and various movement means) that were only generally described in connection with the prior embodiments.

Figure 18:
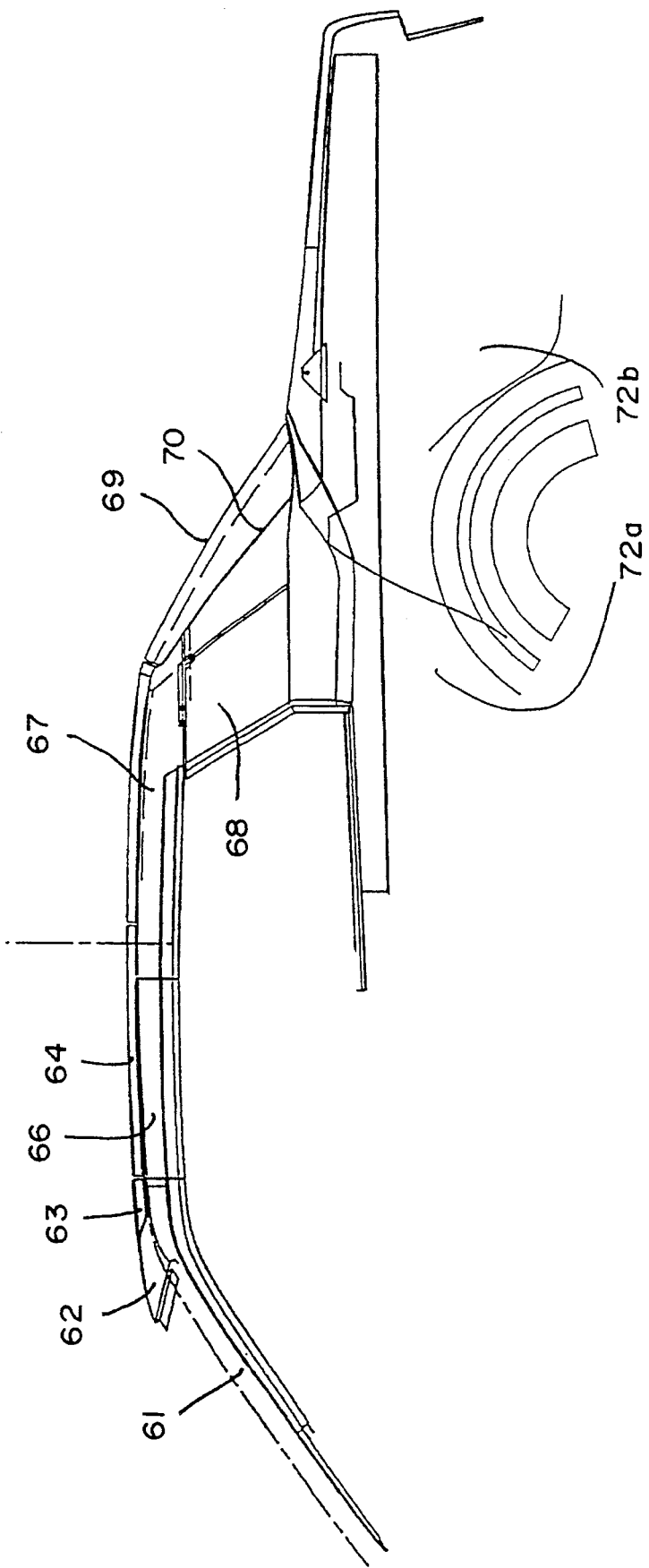
FIGS. 18 and 19 show a fourth embodiment of a vehicle roof of the invention in side and perspective views in the fully closed condition thereof.

In FIG. 18, a windshield is designated 61, to which a forward transverse spar 62 is connected on top. A wind deflector 63, to which a movable cover 64 is connected in the rear, is mounted to pivot on forward transverse spar 62. Cover 64 is guided along two roof parts 66, these parts lying along the lateral side of the cover and being provided with suitable guide rails. Side parts 66 are connected to a rear roof part 67. Rear roof part 67, in turn, is movable in the longitudinal direction of the vehicle and is connected to pivot with two C-pillars 68 lying under it on the side. A rear pane 69 is connected, in the rear, to rear roof part 67, and between pane 69 and the C-pillars 68, triangular windows 70 are placed that are mounted to pivot on C-pillars 68. Further, in FIG. 18, in the area of the rear wheel housing, a stowage space 72a lies in front of the wheel housing or a stowage space 72b lies behind the wheel housing, stowage space 72b taking up part of the trunk.

Figure 19:
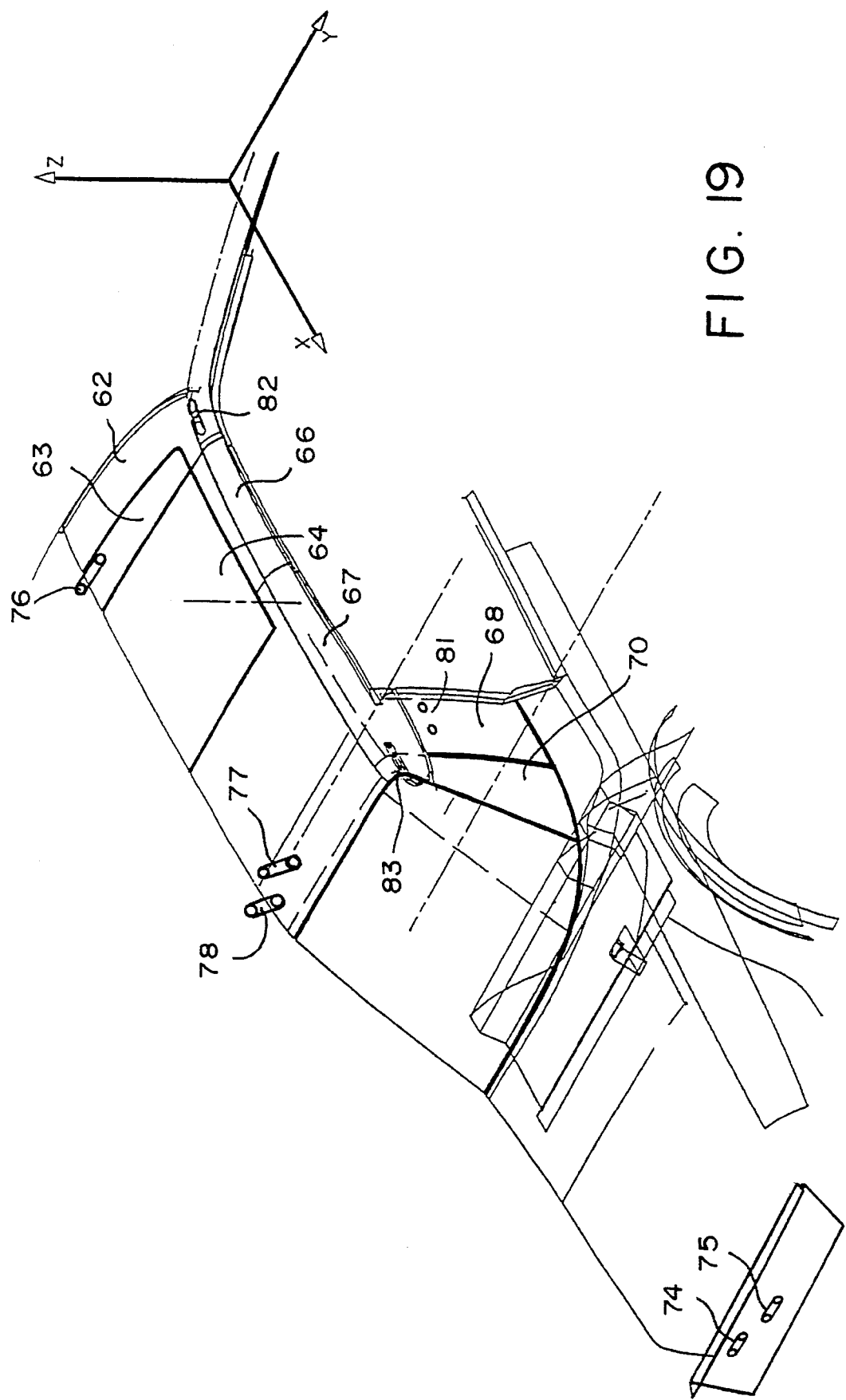

In the perspective partial view of the same vehicle in FIG. 19, the position of the electric drives for moving the roof parts enumerated above can be seen. An electric drive 76, used to pivot out wind deflector 63, is placed on forward transverse spar 62. An electric drive 82 is placed on both sides in each forward transverse spar 62, only one of which can be seen in FIG. 19. This electric drive 82 is used for coupling or releasing a coupling element on side roof parts 66, as described further below. An electric drive 77 for cover 64 and an electric drive 78 for a lengthwise movement and a pivoting movement of side roof parts 66 are placed in rear roof part 67. In C-pillars 68, near their point of separation with top roof part 67, in each case, there is an electric drive 81 that is engaged with the top roof part by a gearing (not shown) and makes possible a lengthwise movement of top roof part 67 relative to C-pillars 68 and a slight pivoting movement of top roof part 67 relative to C-pillars 68.

Hydraulic drives 79 for pivoting of the C-pillars 68 are represented in connection with this embodiment only in FIG. 35 for simplicity's sake. Triangular parts 70, lying between rear window 69 and C-pillars 68, are pivoted on C-pillars 68 by a device 83 made of a spring and cable, so that, with a pivoting movement, they automatically fold inward on the C-pillars because of the spring effect and, with a reversed pivoting-out movement of C-pillars 68, are moved back into their original position because of the cable stretching against the spring force.

Finally, in the rear part of the trunk, two other electric drives 74 and 75 are placed. The electric drive 74 is used for a cover 71 (FIGS. 24 and 25) of the stowage space 72a, 72b which receives the pivoted roof unit. The electric drive 75 actuates the rear window 69 by a cable 90 represented in FIG. 24B, so that the rear window 69 can be moved downward along a guide mechanism 89 before pivoting the roof unit into the rear stowage space 72b, and so that it can be moved back into its original position after resetting the C-pillars 68.

Figure 20:
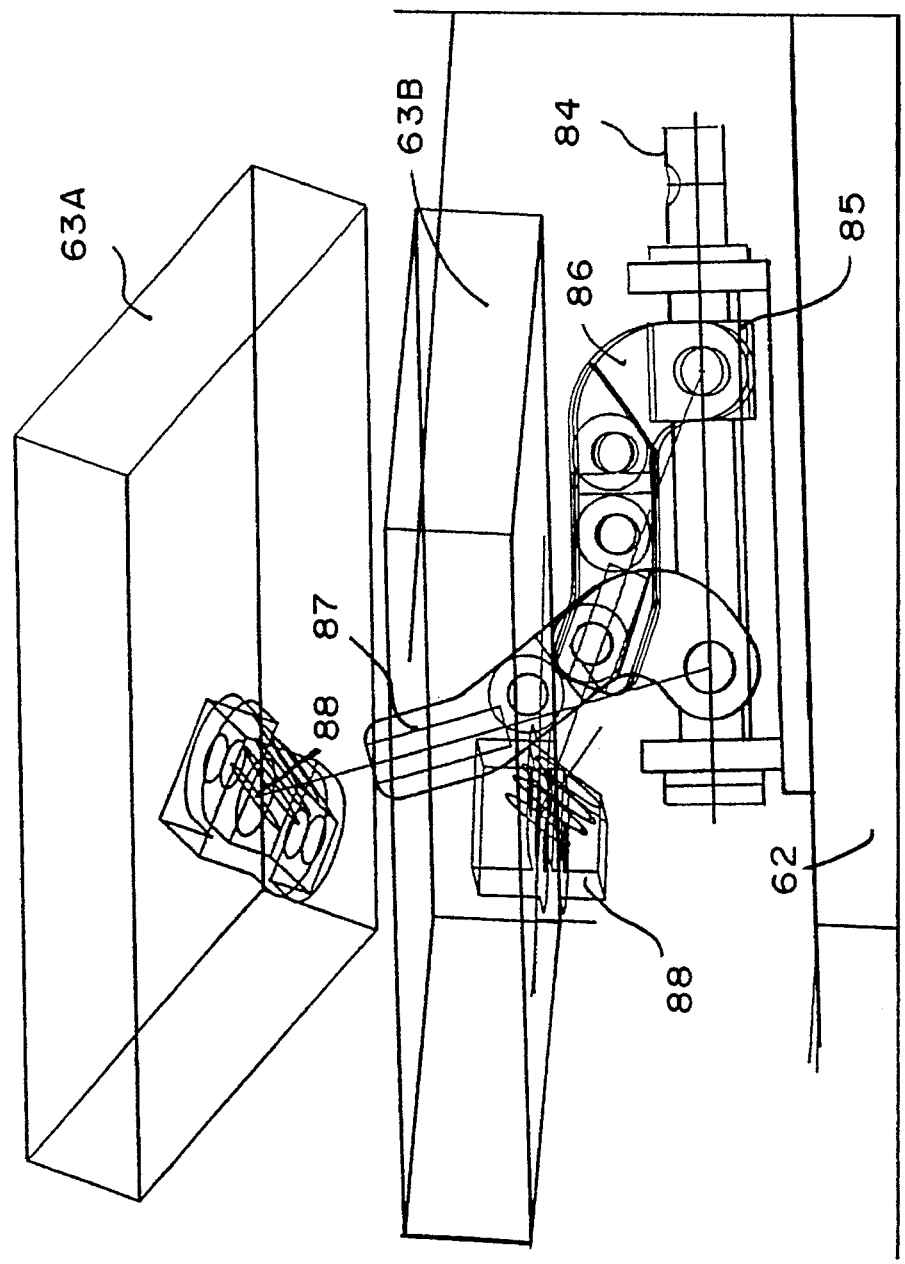
FIG. 20 shows an arrangement suitable for pivoting a wind deflector out.
Figure 21:
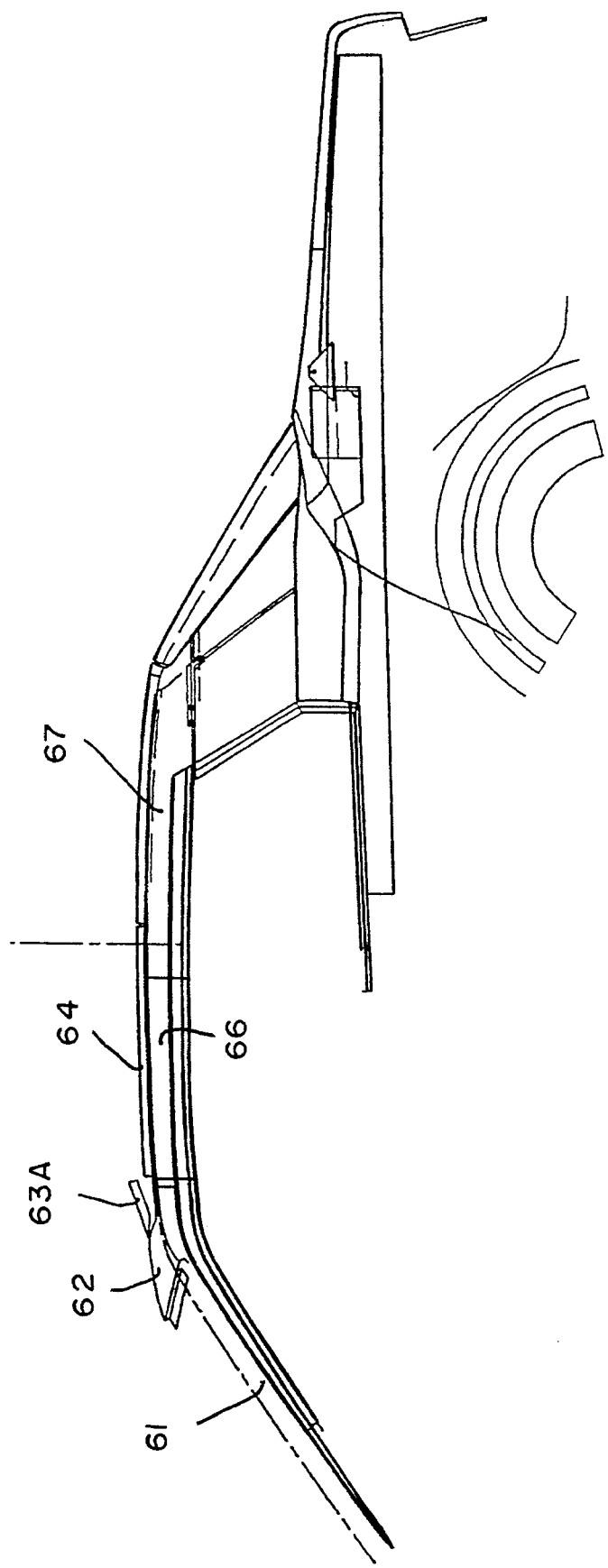
FIGS. 21–23 show various phases of retraction of the cover with a raised wind deflector.

In FIG. 20, an arrangement suitable for pivoting out wind deflector 63 is shown diagrammatically in detail. For this purpose, a spindle 84, provided with an outer thread, and connected to the electric drive 76 shown in FIG. 19, is mounted to pivot on forward transverse spar 62. A threaded socket 85, to which an end of a lever arm 86 is coupled, is engaged in the outer thread of threaded spindle 84. The other end of this lever arm 86 is coupled to a central area of a push-out lever 87, and the push-out lever is mounted to pivot at its bottom end on forward transverse spar 62. The top end of push-out lever 87 is connected by a ball-head connection 88 to wind deflector segment 63. By rotating the spindle 84, threaded socket 85 is moved on spindle 84 and thus entrains, by lever 86, the push-out lever. Depending on the position of threaded socket 85, wind deflector segment 63 is in pushed-out position 63A or in lowered position 63B, as indicated diagrammatically in FIG. 20. In this regard, it is noted that the diagrammatically illustrated position of the lever 87 relative to the positions of the wind deflector positions 63A, 63B in FIG. 20 do not represent actual positions since the lever 87 position shown conforms only with a fully raised position and is not shown connected to the wind deflector 63, itself. As will be appreciated, in practice, the wind deflector raising mechanism comprised of parts 84–87 will be oriented relative to the wind deflector 63 and its path of swinging movement so as to enable pivoting of lever 87 to properly swing wind deflector 63 with movement of socket 88 affording necessary relative between lever 87 and wind deflector 63. The pushed-out position of wind deflector 63 can be seen again in FIG. 21 at position 63A.

Figure 22:
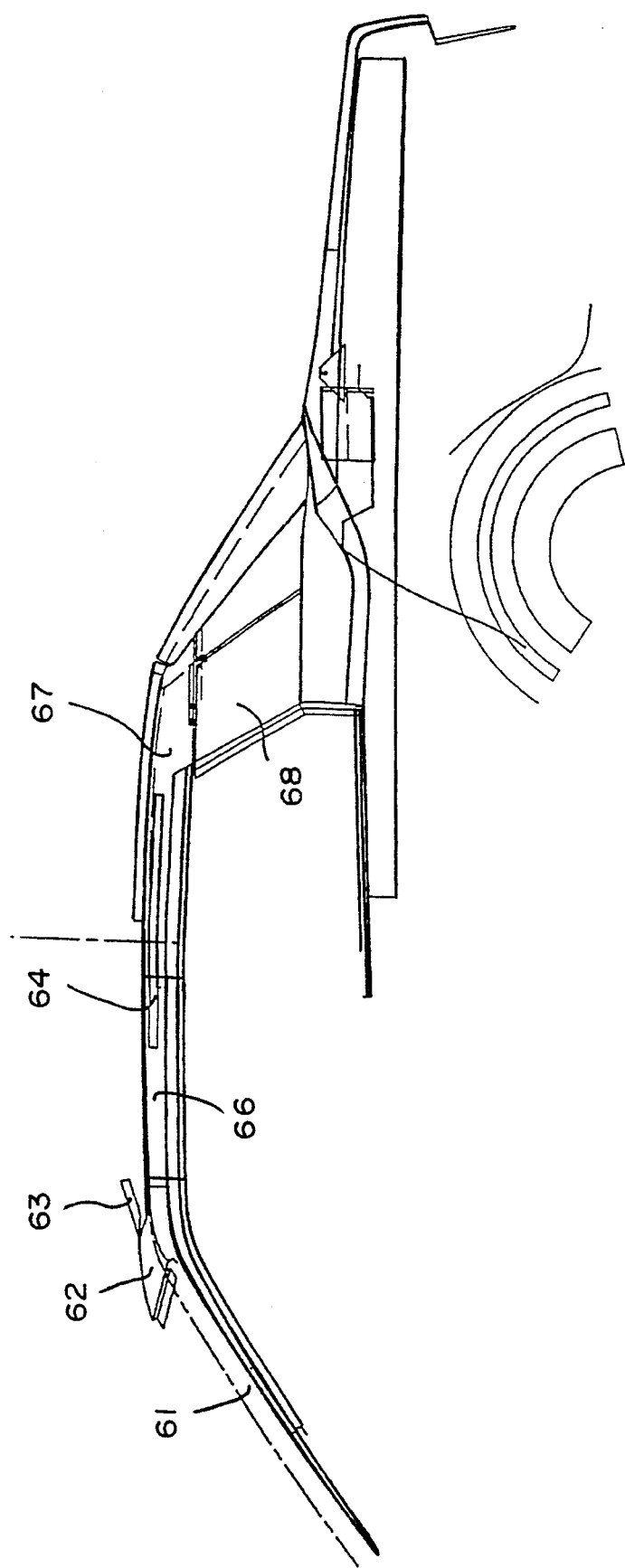
Figure 23:
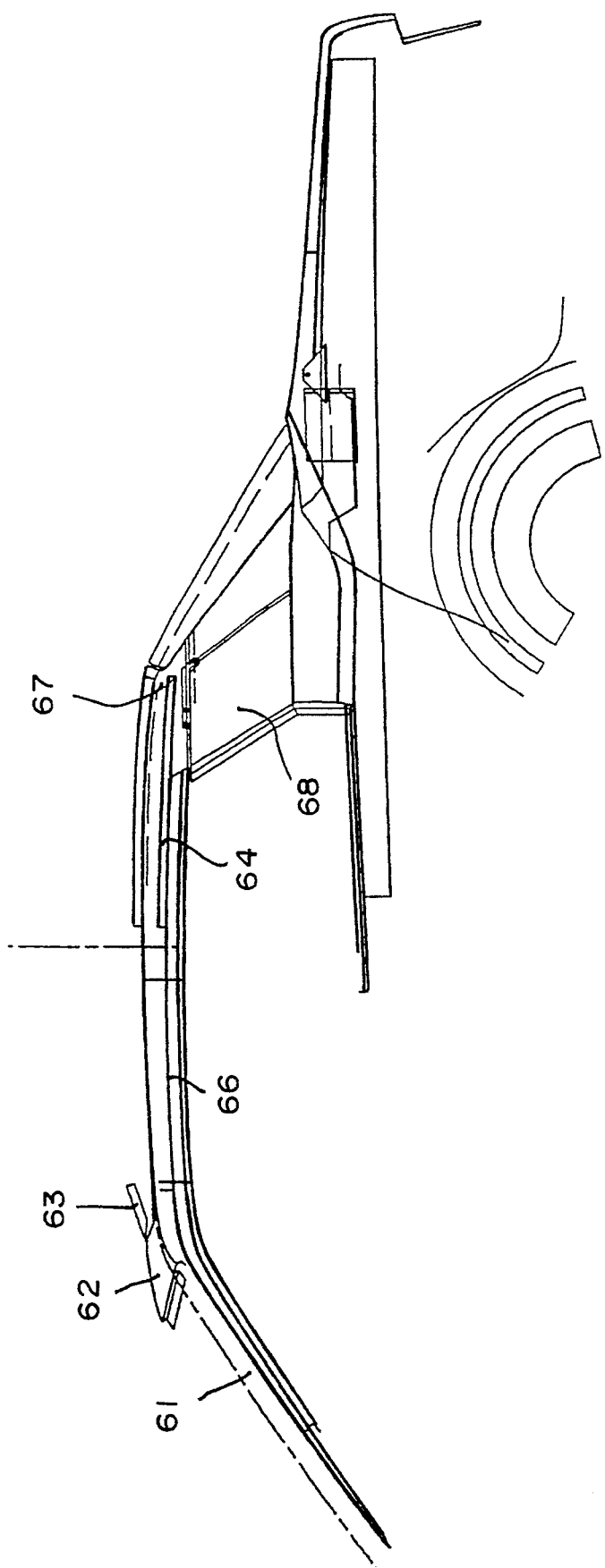

In FIG. 22, after pushing out wind deflector 63, cover 64 has been moved partially rearward along guide mechanisms placed adjacent to side roof parts 66 by electric drive 77 lying in rear roof part 67. Here, the cover 64 is partially received in a receptacle in the rear roof part 67, and in FIG. 23, cover 64 is completely retracted and is received completely by top roof part 67.

As the next stage in the gradual opening of the entire roof, first, a cover 71 that lies in a generally horizontal, normal position between the rear seats (not shown) and the rear window 69 and that normally covers the access to both stowage spaces 72a and 72b, is moved rearward by electric drive 74 and the drive cable 91 connected to it. Then, rear window 69 is moved downward, from the closed position illustrated in FIG. 24A, by an electric drive 75 and a drive cable 90, as indicated in FIG. 24B, along guide rails 89 which are fixed to the car body in rear stowage space 75b. For this purpose, the frame of rear window 69 has a rigid connecting element 69a at each lower corner thereof, to which a slide element 69b is attached. These slide elements 69b are received in the guide rails 89 and include a tilting mechanism by means of which, at the beginning of the lowering operation, the rear window is initially tilted away from a window seal on the rear roof part, in the same manner that known sliding roofs are first pivoted to lower the rear edge of the cover panel before being rearwardly retracted under the fixed roof surface. After rear window 69 has been completely lowered into rear stowage space 72b, cover 71 is again moved forward.

Travel with lowered rear window 69 is thus another intermediate state that makes it possible to travel with a very great ventilation effect in the vehicle interior with the roll cage made of C-pillars 68, rear roof part 67, side roof parts 66 and forward transverse spar 62, still closed. This position with rear window 69 lowered and cover 71 again closed is represented in FIGS. 25 and 26.

Figure 26:
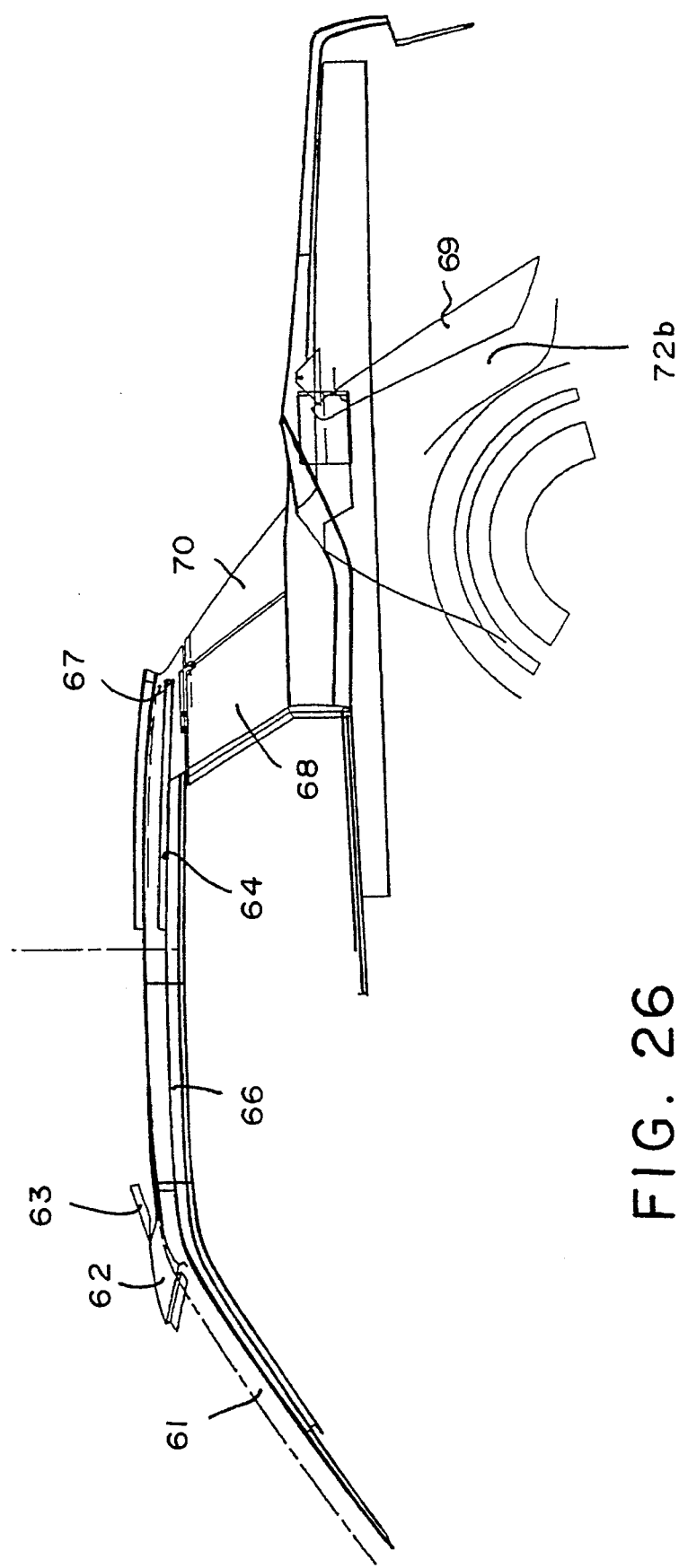
FIG. 26 depicts the vehicle roof after lowering and stowage of the rear window.
Figure 27:
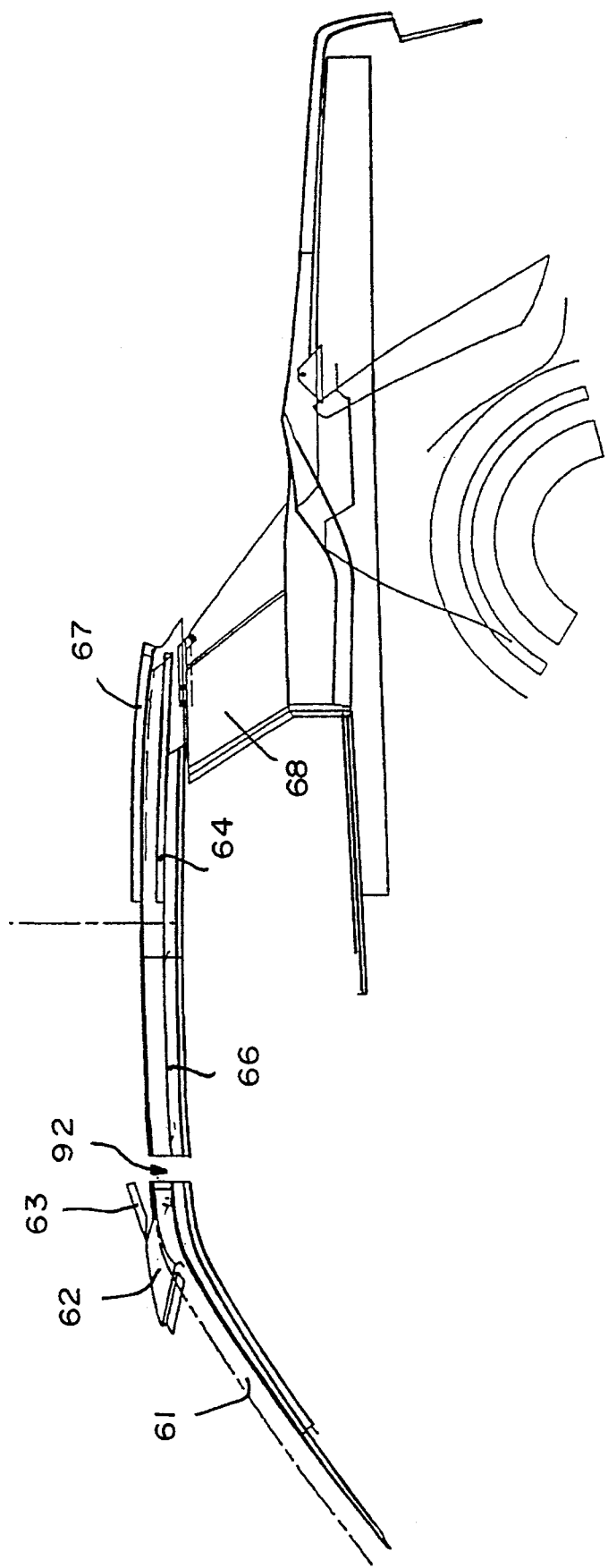
FIG. 27 depicts an initial phase in the process of storing the normally fixed roof parts.

In the transition from FIG. 26 to FIG. 27, rear roof part 67 was moved horizontally rearward a small distance relative to C-pillars 68 by drive 81 (see FIG. 19) along with the cover 64 received in it and side roof parts 66 attached to it. But, for this purpose, as described below, the locking of side roof parts 66 relative to front transverse spar 62 must be released in advance.

Figure 28:
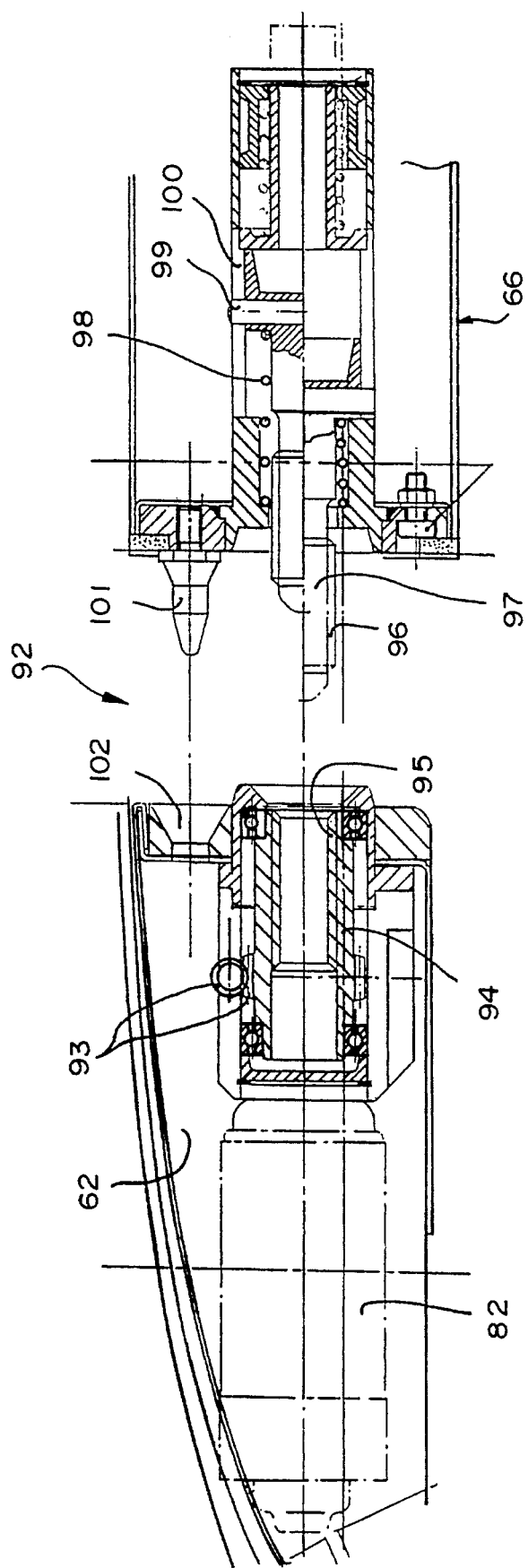
FIG. 28 is a cross-sectional view of a coupling connection between side roof parts and forward transverse spar.

The coupling connection between side roof parts 66 and forward transverse spar 62 is shown in detail in FIG. 28. An electric drive 82 is placed in each side of forward transverse spar 62, as can be seen also in FIG. 19. Electric drive 82 is connected to drive a threaded socket 94, which is mounted to rotate in bearings in forward transverse spar 62, by a two-stage, only partially shown, worm gear 93. Threaded socket 94 has an inner thread 95 which interacts with an outer thread 96 of a bolt 97. Bolt 97 is mounted to slide longitudinally on side roof parts 66 against the force of a spring 98 in side roof part 66, but is prevented from rotating by a pin 99 that engages in a slot 100.

A centering pin 101 is integrally connected to the side roof part 66, and with movement of the roof part 66 in the vehicle longitudinal direction toward the spar 62, it engages in a centering receptacle 102 on forward transverse spar 62. When side roof part 66 is to be coupled with forward transverse spar 62, the side roof part 66, which is connected to rear roof part 67, is moved toward forward transverse spar 62 by electric drive 81 mounted in C-pillar 68. By the two-stage worm gear and with greatly reduced speed, electric drive 82 turns the threaded socket 94 in a slow rotating movement. Centering pin 101 plunges into centering receptacle 102 and assures, because of the tapered shape of receptacle 102, a precisely defined impact of side roof part 66 on forward transverse spar 62. Threaded bolt 97 provided with outer thread 96 plunges, after centering, into the slowly rotating threaded socket and is drawn, by its rotating movement and the engagement of outer thread 96 in the inner thread 95, toward forward transverse spar 62. As soon as pin 99 has reached its final position in slot 100 (to the left in FIG. 28), the entire side roof part 66 with rear roof part 67 is drawn tightly to forward transverse spar 62 and thus arrested. By a circuit breaker monitoring the current consumption of electric drive 82, as a result of too great an increase in drive current, electric drive 82 is shut off when the final position is reached. The decoupling of side roof parts 66 relative to forward transverse spar 62 is performed by rotating threaded socket 94 by electric drive 82 in the opposite direction with simultaneous backward movement of side roof parts 66 with rear roof part 67 by drive 81. Gap 92 that results from moving side roof parts 66 backward is used to make possible the following pivoting movements.

Figure 29:
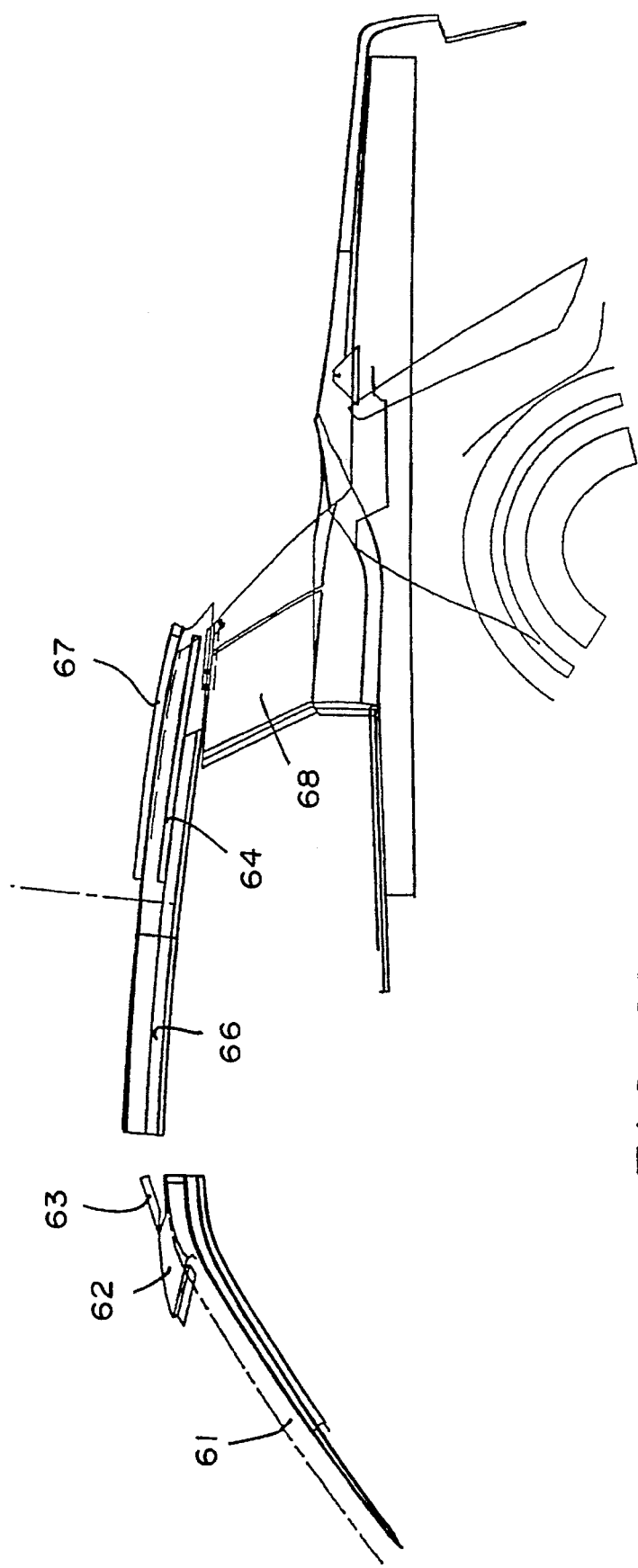

In FIG. 29, the roof unit comprised of the rear roof part 67, cover 64 received in it and side roof part 66 attached on rear roof part 67, has been shifted by drive 81, shown in FIG. 19, into a position that is tipped upward relative to C-pillars 68 by about 5° to the horizontal. This tipping movement is necessary to be able to perform a danger-free pivoting movement of side roof parts 66 in relatively flat vehicles with limited head room for the passengers. It can also be eliminated in vehicles with sufficient structural height and headroom.

Figure 31:
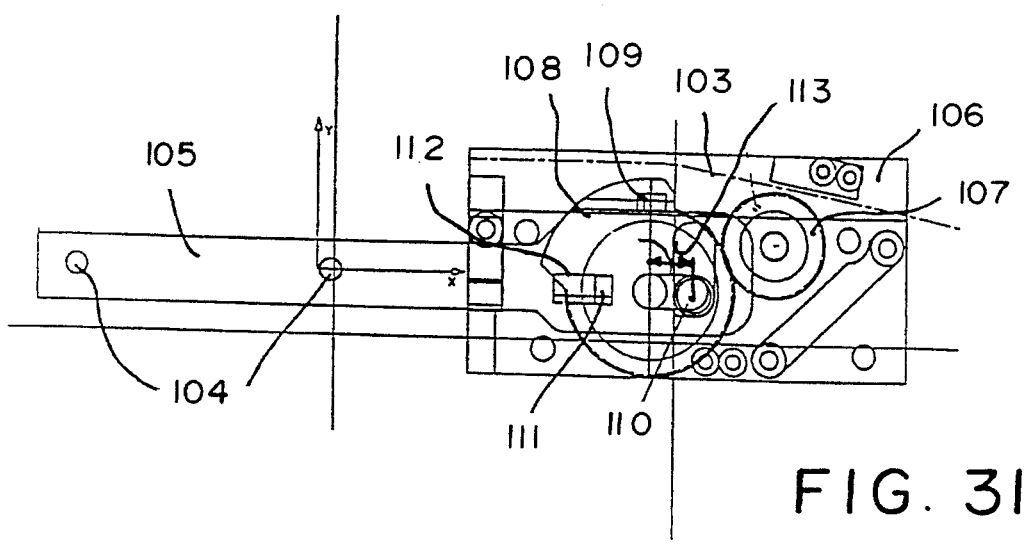
FIGS. 31 to 33 show the pushing-pivoting mechanism for the pivoting of side roof parts of the roof.
Figure 32:
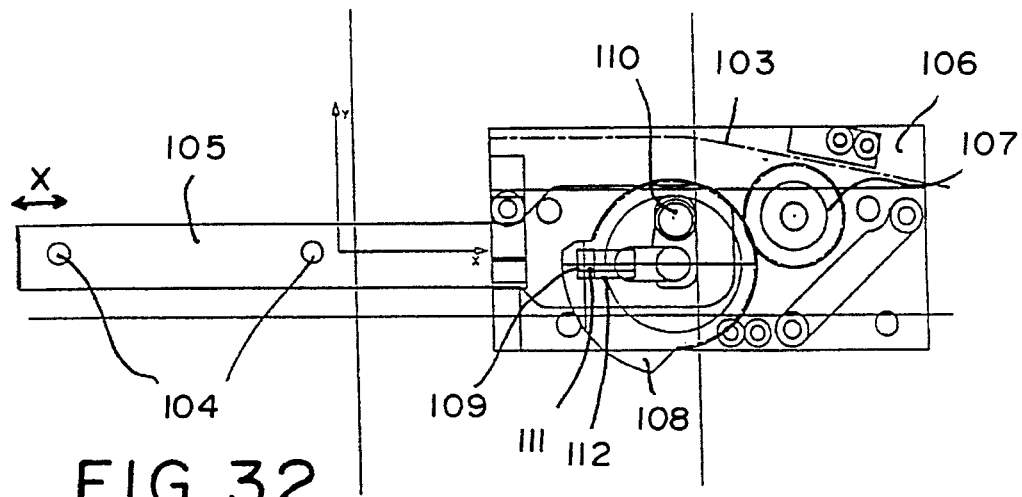

For the following pivoting-in of both side roof parts 66 (FIG. 30) by the pushing-pivoting mechanism shown in FIGS. 31 and 32, first, side roof part 66 is moved forwardly away from rear roof part 67 a short distance in the vehicle's longitudinal direction, and then it is pivoted inward. In contrast to the first embodiments, in this fourth embodiment, the side roof parts 66 are so short and the vehicle is so wide, that both side roof parts 66 can be folded, with their end faces facing each other, onto rear roof part 67 without overlapping.

Figure 33:
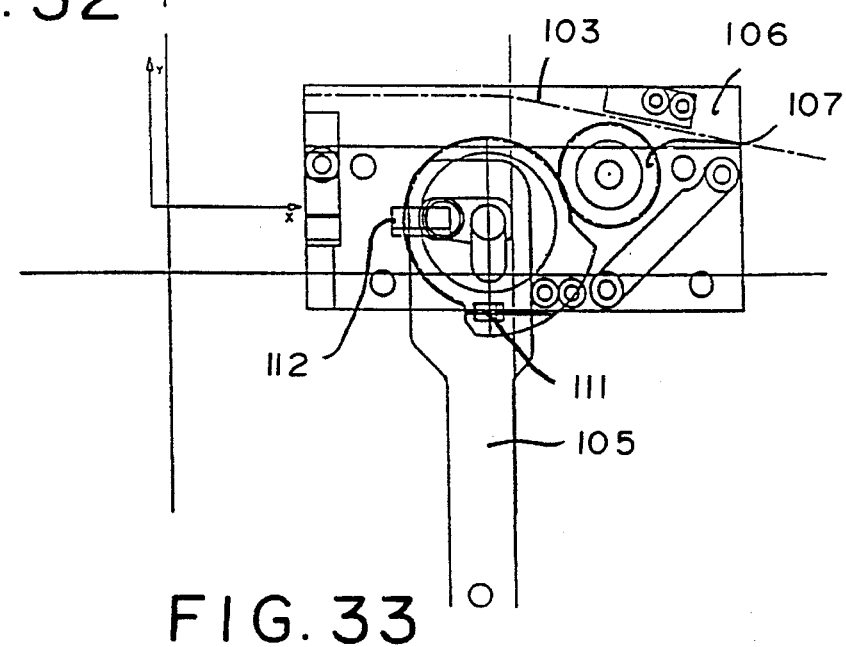

In FIGS. 31 to 33, the pushing-pivoting mechanism for the pivoting of side roof parts 66 is represented in detail.

Side roof parts 66 are integrally connected to lever arm 105 at attachment points 104. The pushing-pivoting mechanism is arranged, overall, on a base plate 106 which is secured to the rear roof part 67. A pinion 107 that is engaged with a drive cable 103 and driven by electric drive 78 is mounted to pivot on the base plate 106. Pinion 107, for its part, has its teeth engaged in the teeth on a cam 108. Near the outer periphery of the cam, a rectangular recess 109 is provided, and the cam also has a bolt 110 firmly connected to it. The pivot axis of cam 108 is formed by a shaft that is firmly fixed in base plate 106. A rectangular slot 112, that extends in its normal position in the lengthwise direction of lever arm 105, is also present in base plate 106. In this slit 112, a locking block 111 is mounted to slide. The locking block 111 can also be moved normal to the drawing plane of FIGS. 31 to 33, i.e., in the Z direction (the X and Y directions being in the plane of the drawing, as represented). A detent slot 113, in which bolt 110 engages, is provided on lever arm 105, essentially crosswise to its longitudinal direction. By sliding drive cable 103 to the left, pinion 107 is pivoted, and in doing so, it rotates cam 108 from the position of FIG. 31 into the position in FIG. 32 by an angle of 90° in a counterclockwise direction. Since bolt 110, by engagement in detent slot 113, entrains lever arm 105, lever arm 105 moves a distance X to the left. Thus, the side roof part 66 attached to lever arm 105 is brought forward a distance from rear roof part 67 that makes possible the subsequent pivoting of side roof part 66. Simultaneously, locking block 111, inside rectangular slot 112, is entrained by the same distance to the left, and thus, from the position shown in the figure, block 111 can engage in rectangular recess 109 of cam 108 by a vertical movement out of the drawing plane toward the observer with the result that the cam 108 is to lever arm 105 so it cannot pivot relative thereto. With a further counterclockwise pivoting of cam 108 from the FIG. 32 position to that of FIG. 33, by another 90°, the lever arm 105 is entrained to pivot with the cam 108.

The representations in FIGS. 31 to 33 are of a top view of the pushing-pivoting mechanism for the part 66 at the right side of the roof which, in FIG. 33, is pivoted inward toward the vehicle's center and toward rear roof part 67. The actuation of locking block 111 is performed automatically by a ramp-like surface on base plate 106 that runs at an incline to X-axis. Thus, with a reversed movement of the pushing-pivoting mechanism when the position shown in FIG. 32 is reached, locking block 111 is again brought out of engagement with cam 108 and moves, with further pivoting toward the FIG. 31 position, back again to the right into the position shown there.

After side roof parts 66 are pivoted toward rear roof part 67, the entire roof unit made of rear roof part 67, cover 64 received in it and side roof parts 66, as represented in FIG. 34, travels by drive 81 further rearward relative to C-pillars 68. Then follows, as represented in FIG. 35, a pivoting of C-pillar 68 and the roof unit by an angle that aligns rear roof part 67 approximately parallel to the already lowered rear window 69 in rear stowage space 72b. The pivoting of the pillars and roof unit is performed by the hydraulic cylinder mechanisms of the hydraulic drive 79 that are coupled to C-pillars 68 and that are coupled, like hydraulic cylinders 19 of the first embodiment, in the area of the B-pillars, i.e., behind the doors. In this position, as represented in FIG. 36, rear roof part 67 is moved further rearward relative to C-pillars 68 by drive 81, so that a guide bolt 115, provided on both sides of rear roof part 67, becomes engaged in a guide rail 114 that is placed in rear stowage space 72b. Then, by hydraulic drive 79, C-pillar 68 is pivoted further downward, and rear roof part 67 folds away from the C-pillars 68 and the joint by which it is supported on its front edge, and glides downward along guide rails 114 with its guide bolts 115.

FIG. 37 shows the final position with the roof completely lowered. In this position, the C-pillar 68 with triangular window 70 folded onto it is lowered in forward stowage space 72a and the roof unit consisting of the rear roof part 67 with side roof parts 66 and cover 64 is lowered into rear stowage space 72b. Of course, before lowering the roof, as was the case for the lowering of rear window 69, cover 71 must be moved briefly rearward to the position shown in FIG. 24B, and then, after the roof is completely lowered into stowage spaces 72a and 72b, again moved forward back to the position shown in FIG. 25.

An actuation device for the above-described roof preferably comprises 3 switches which are located on a console, not represented, between the driver's and passenger's seat. When a first switch is pressed, first wind deflector 63 is pivoted out, and by a further pressing of this switch, the cover 64 is moved rearward. By releasing the first switch, any intermediate positions can be achieved. The second switch is used to close cover 64 and, by further pressing it, for subsequent closing of the wind deflector. Here also, depending on the actuation period, various intermediate positions can be achieved.

By briefly pressing the third switch, starting from the normal position according to FIG. 18, but also in any other positions up to completely open, cover 71 is opened (FIG. 24B), rear window 69 is lowered and cover 71 is again closed (FIG. 25). Another actuation of the third switch causes, vice versa, an outward movement of rear window 69 connected with the retreating and approaching of cover 71 necessary for this.

Finally, by simultaneous pressing of the first and second switches, a complete lowering of the roof is begun, independent of the opening position of the cover at that time, with all courses of movement necessary therefor. Another simultaneous pressing of the first and second switches causes a complete closing of the roof.

By the embodiment described above it is possible to use stowage spaces in front of and behind the rear axle of a vehicle for a space-saving accommodation of a roof according to the invention.

The embodiments described above can, as described above, be equipped not only with conventional rigid covers that can be moved under the rear roof part (see U.S. Pat. Nos. 4,911,497 and 4,537,442) but also with spoiler-type covers that can be moved above the rear roof part with its sliding shoes leaving the side roof parts and being received by the rear roof part (see U.S. Pat. No. 4,647,106), or with removable lifting roofs, or with foldable roofs that can be moved rearward. Further, to receive the openable roof parts, the usually stationary roof part does not have to be a rear roof part, but can also be a forward roof part located about between A- and B-pillars that receives covers attached to the rear and their lateral guideways, then travels rearward about up to the height of the C-pillars and then is stowed in the stowage space. In all variants, the advantage is maintained that a single vehicle can be used in different stages of movement, from a closed state, in which traveling comfort and safety approach that of a sedan, to a completely lowered convertible roof.

Figure 38:
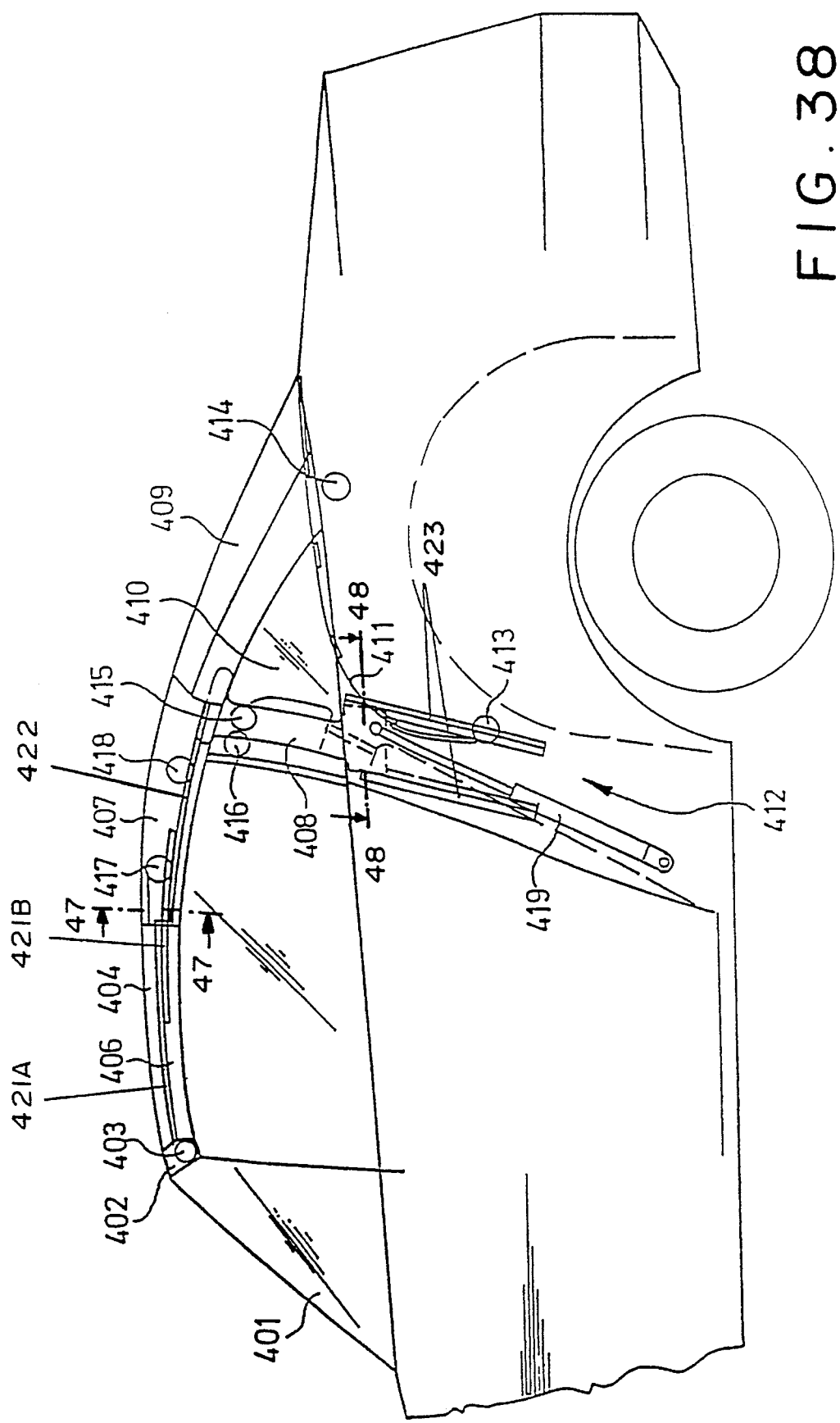
FIG. 38 is diagrammatic side view of a vehicle with another embodiment of a roof according to the invention in the closed position with all necessary drives.

Another embodiment will now be described relative to FIGS. 38–48. In this embodiment, as shown in FIG. 38, the vehicle roof has a front transverse spar 402 which adjoins a windshield 401. The transverse spar is detachably connected on each side with a lateral roof part 406, and locking of lateral roof parts 406 relative to the front transverse spar 402 is obtained by a spindle-type locking mechanism driven by an electric drive 403 in the front transverse spar 402. Such a locking mechanism corresponds to that described above relative to FIG. 28 (e.g., drive 403 corresponds to drive 82).

Lateral roof parts 406 are mounted to a rear roof part 407 that is stationary when the roof is in its "sunroof mode" where it is configured for use as a sunroof of "hard top" sedan type vehicle, i.e., at all times except when the roof is to be stored for use of the vehicle as a convertible. After loosening the locking of the lateral roof parts 406 to the front transverse spar 402, parts 406 can be telescopically retracted by a drive 418 into corresponding recesses of rear roof part 407, for which purpose a pair of telescopic guides 421A, 421B (FIG. 47) are provided, telescopic guide 421 being connected to lateral roof part 406 and telescopic guide 421B being received in a slide track fixed within lateral roof part 406. The telescopic guides 421A, 421B vary in height along at least a portion of their length, so that the rear ends of the lateral roof parts 406 can be lowered as they are retracted in order that they can pass into the rear roof part 407. In this regard, due to the tapered nature of the centering pins 101 and the fact that the threaded bolt 97 is supported with radial play via pin and slot arrangement 99, 100, lowering of the lowering of the lateral roof parts at their rear ends as they are retracted does not interfere with disengagement of the locking mechanism at their front ends.

On rear roof part 407, guide rails 420 are provided on the inside for guiding the operating mechanism of movable roof cover part 404. Cover 404 can be pushed out by a drive 417 arranged in rear roof part 407 so that its rear edge is raised relative to rear roof part 407 (FIG. 39), or after lowering its rear edge, can be moved under rear roof part 407, both actions being obtained in the manner of known sliding-lifting roofs and since mechanisms for this purpose have been known for decades, the details thereof are not described here.

Rear roof part 407 is mounted on two B-columns 408 each of which are connected with the car body at a respective side thereof in a manner allowing it to be movable relative to the B-columns 408 in lengthwise direction of the vehicle along guides 422 (FIG. 47) and can be pivoted around the upper edge of the B-column by a certain amount, by a drive 416 mounted in B-columns 408. A rear window 409 adjoins rear roof part 407 toward the rear. Window 409 is connected on its lateral edges with a flame-shaped part. Rear window 409 is also mounted on B-column 408, so that with its upper edge it can be swung away from the column 408 (FIG. 43) by a drive 415 arranged in the B-column 408.

Between rear window 409 and B-columns 408, rear side windows 410 are provided on both sides. Rear side windows 410 can be lowered by an electric drive 414 into a storage space 412, which is located between the seats of the vehicle and the rear axle (FIG. 5) via a conventional power window operating mechanism. A drive 419 for lowering B-columns 408 along guide 423 is also located on both sides of this storage space 412. Drive 419 is preferably a hydraulic cylinder. The above-mentioned drives are represented only schematically in FIG. 38 For reasons of simplification of the drawings.

Starting from the representation in FIG. 38, the cycle of the conversion of the roof from a stationary roof to a completely open convertible-type vehicle is now described based on FIGS. 39 to 46. Here, only the respectively involved parts are provided with reference symbols in the figures in question.

Figure 39:
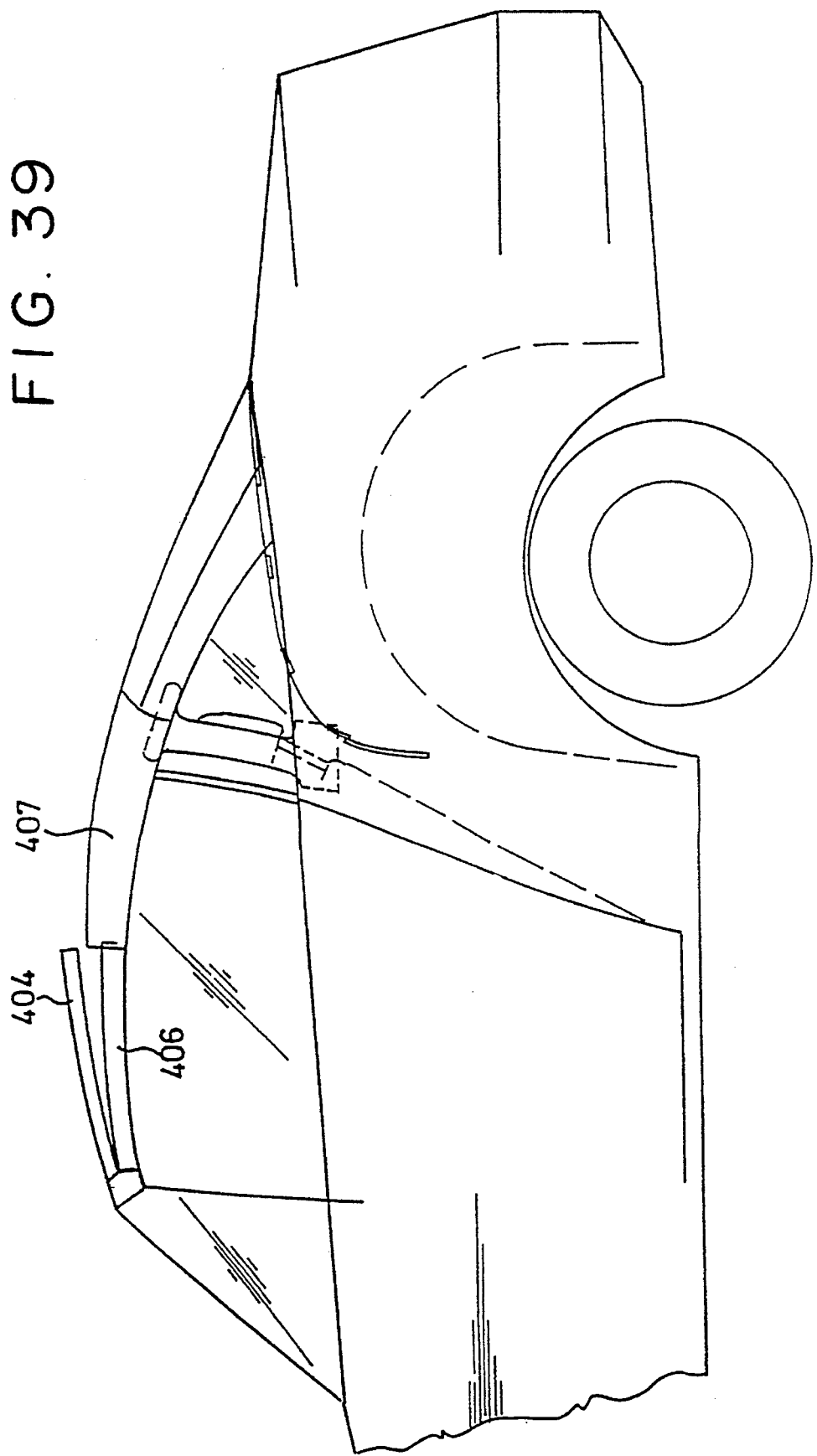
FIG. 39 shows the vehicle roof of FIG. 38 with a pushed-out sliding-lifting roof cover.

In FIG. 39, cover 404 of the sliding-lifting roof is pushed out upward with its rear edge opposite rear roof part 407 and thus exposes a ventilation gap on its rear edge and on both sides. In doing so, the push-out mechanism moves on the guide rails 420 for roof cover part 404.

Figure 40:
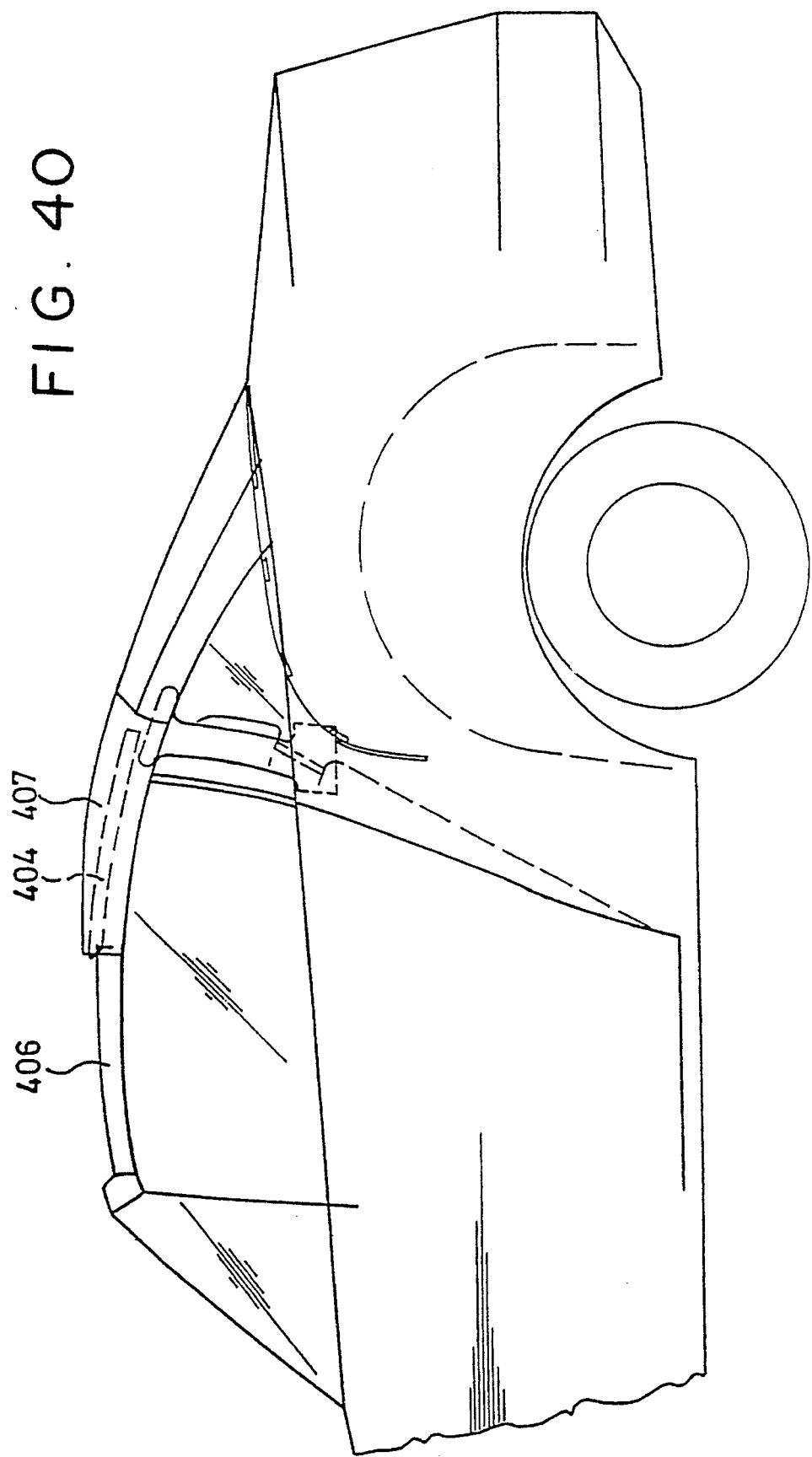
FIG. 40 shows the vehicle roof of FIG. 38 with the cover moved completely toward the rear.

In FIG. 40, cover 404 has been retracted completely into rear roof part 407 by drive 417. The guiding of the front and rear sliding elements, not shown, of the cover 404, takes place, in this case, again on the guideways 420. In this intermediate stage, according to FIG. 40, the vehicle resembles a vehicle equipped with a conventional sliding-lifting type sunroof in a fixed roof.

Figure 41:
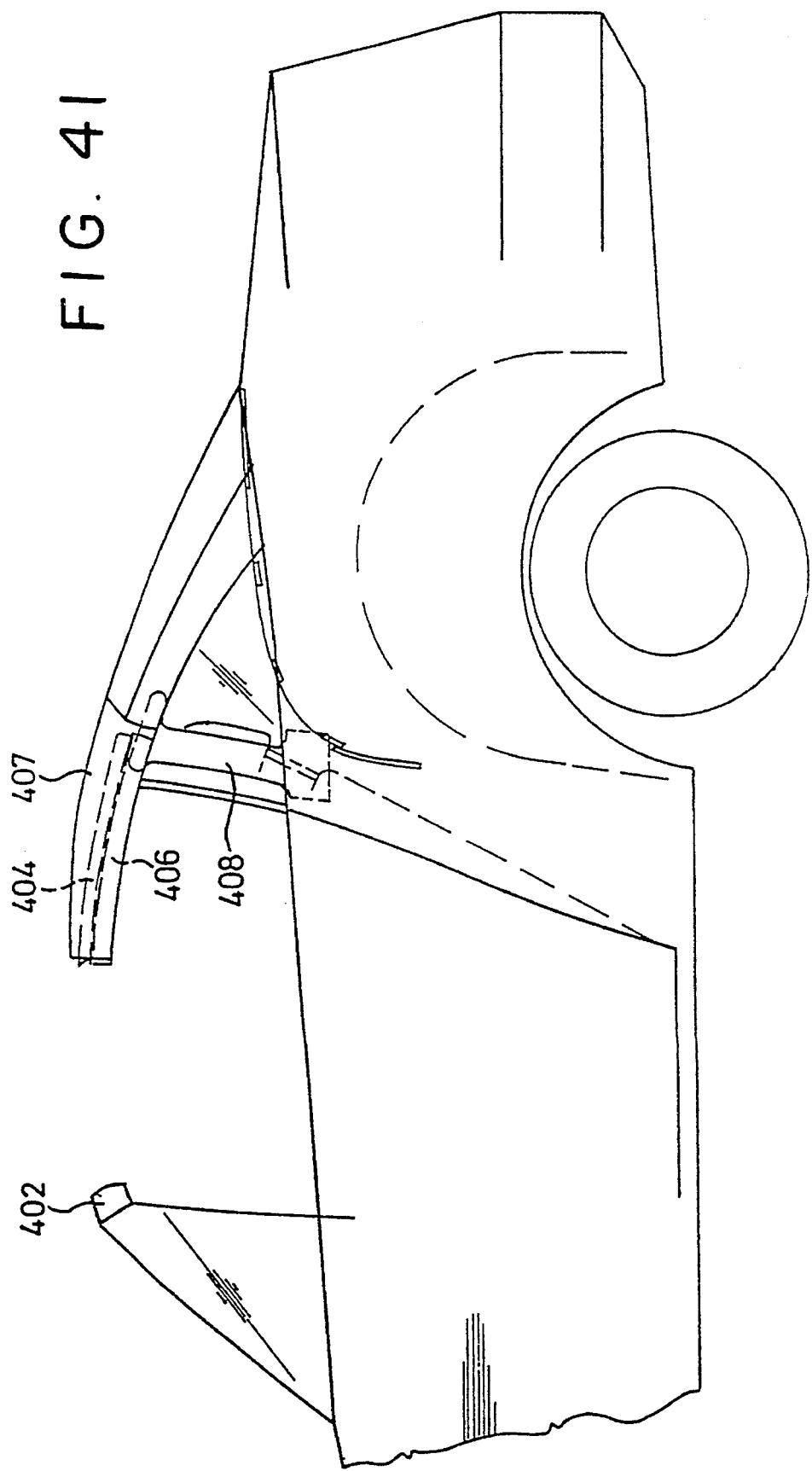
FIG. 41 shows the vehicle roof of FIG. 38 with lateral roof parts inserted in the rear roof part.

To get from the representation of FIG. 40 to the representation in FIG. 41, the locking of lateral roof parts 406 relative to front transverse spar 402 is first neutralized by drives 403 in front transverse spar 402. Then, lateral roof parts 406 are telescopically retracted by drive 418 into rear roof part 407, under cover 404 and laterally of it. In this intermediate stage, the vehicle roof offers a shield-like outward appearance with a front roll bar formed by front transverse spar 402 and the A-columns and with a rear roll bar formed by rear roof part 407 and B-columns 408 and is similar to a so-called "targa" roof with a lift-out front panel that spans the width of the roof.

Figure 42:
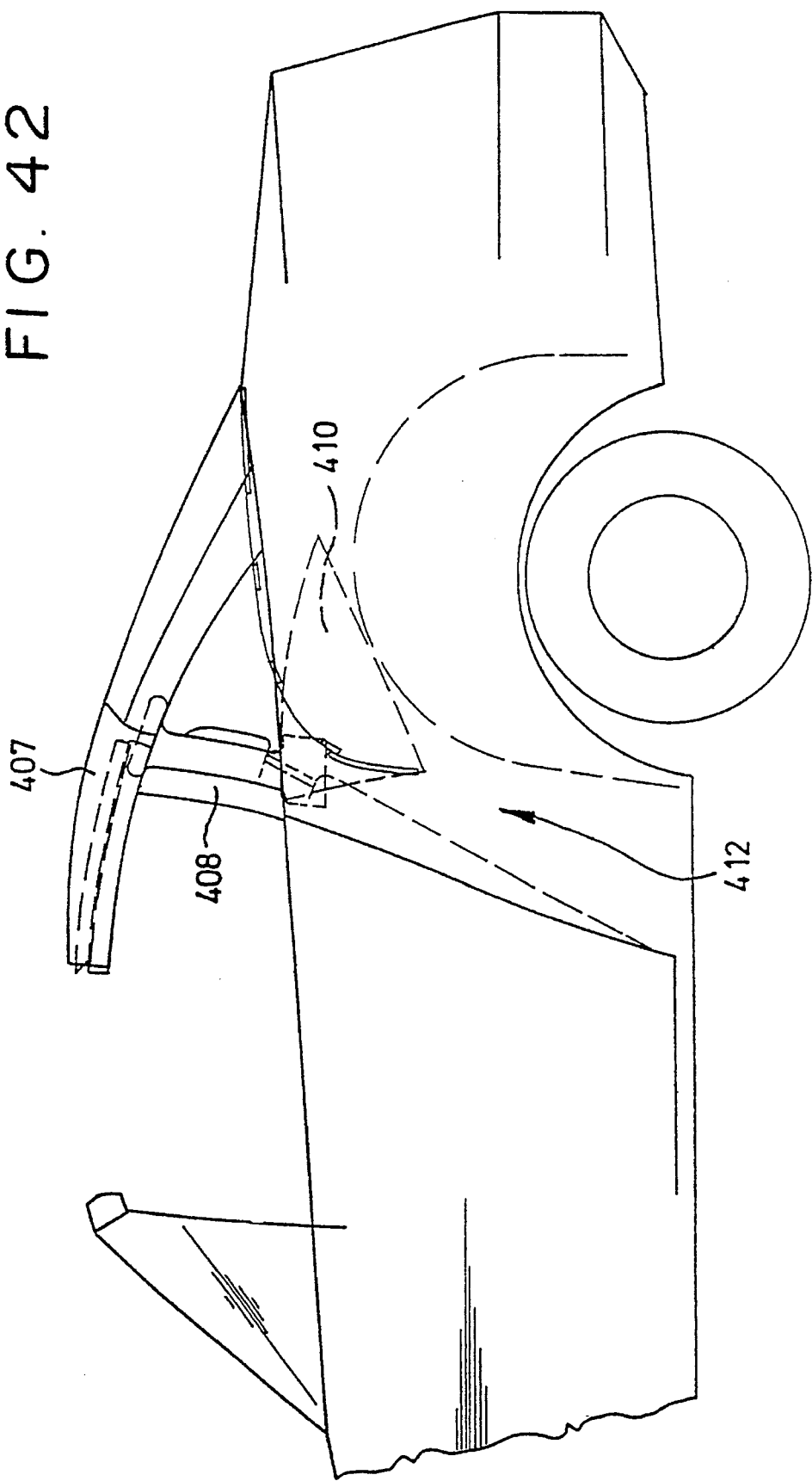
FIG. 42 shows the vehicle roof of FIG. 38 with lowered rear triangular windows.

In FIG. 42, rear triangular windows 410 are lowered laterally into the upper part of storage space 412 by drives 414. Also, in this intermediate position, the vehicle is ready for driving and has a considerably improved ventilation action.

Figure 43:
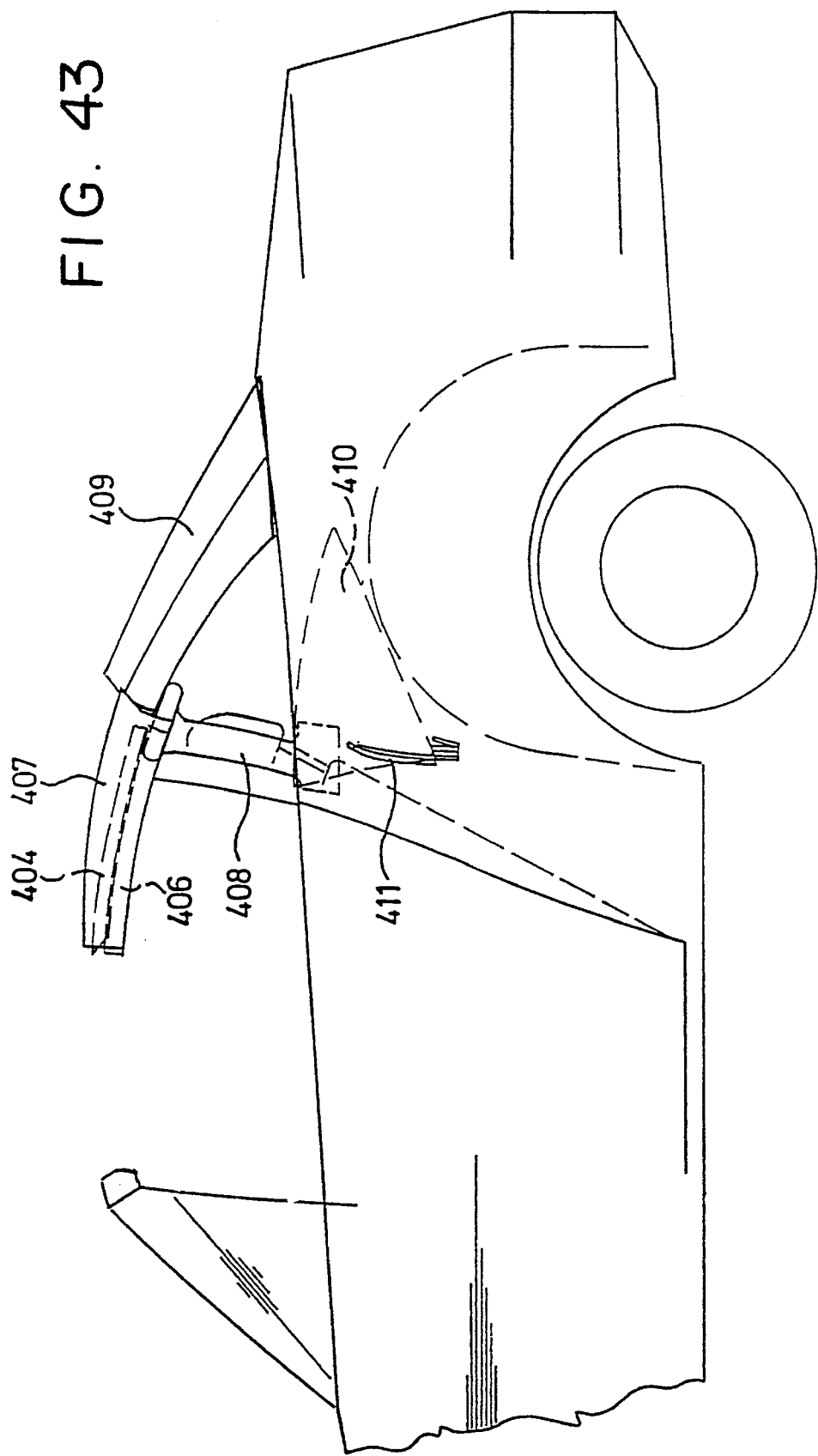
FIG. 43 shows the vehicle roof of FIG. 38 with the rear window raised.
Figure 44:
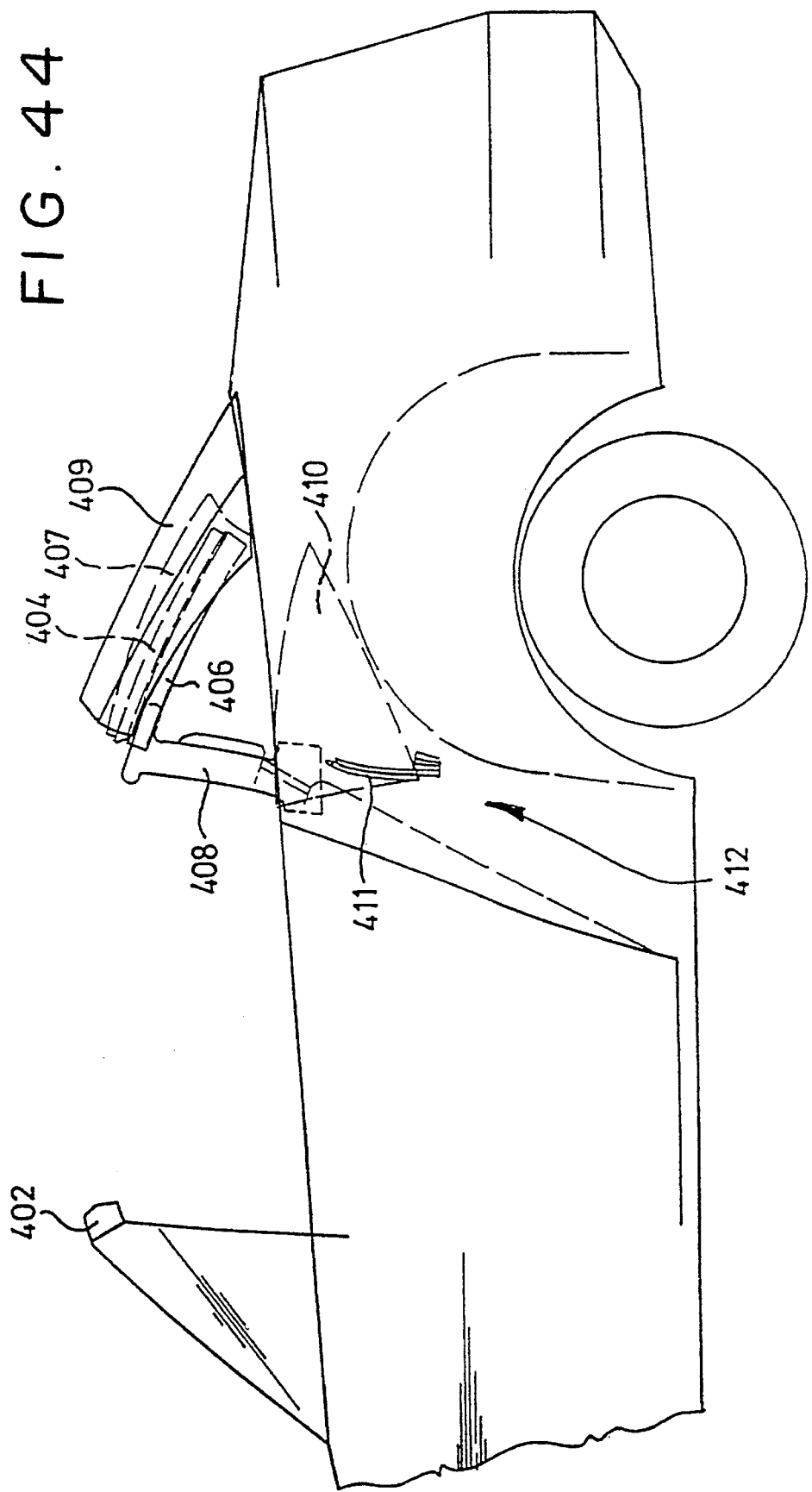
FIG. 44 shows the vehicle roof of FIG. 38 with the rear roof part moved under the rear window.

In FIG. 43, the upper edge rear window 409 has been swung upward from B-column 408 by drive 415 by an amount sufficient to make it possible for drive 416 to move the rear roof part 407 underneath rear window 409, as shown in FIG. 44. FIG. 44 also shows the complete package, of rear roof part 407 with cover 404 and lateral roof parts 406 retracted into it, located below the rear window 409. In this intermediate stage, the vehicle exposes a large roof opening between front transverse spar 402 and the B-columns 408. Before the retracting of the rear roof part 407 under rear window 409, a covering 411 is retracted into the storage space 412 by a drive 413, arranged laterally in storage space 412 to open the top of the storage space 412. This becomes clear from the difference between FIGS. 38 and 43.

Figure 45:
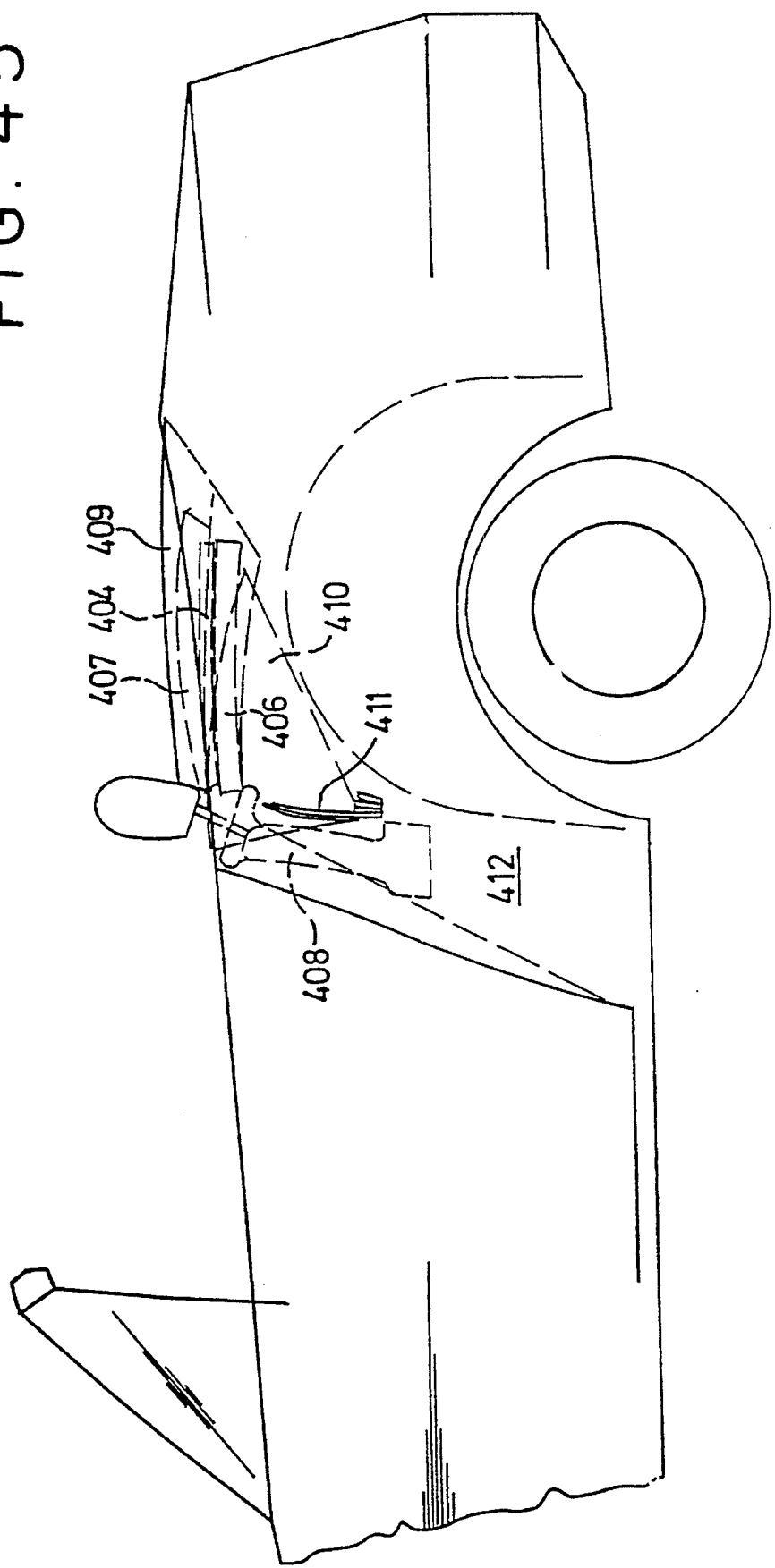
FIG. 45 shows the vehicle roof of FIG. 38 with lowered B-column.

In FIG. 45, B-columns 408 have been retracted by drives 419, along guides 423 (shown in FIGS. 38 & 48) attached to the vehicle body 425, into storage space 412, in which, simultaneously, the package of the rear roof part 407 with cover 404 incorporated into it and lateral roof parts 406 as well as rear window 409 lying above it are placed in the upper part of storage space 412. In this position, rear window 409 can be swung downward by drive 415 to form a covering for storage space 412, extending approximately horizontally from the rear of the storage space to directly adjacent to the headrests of the seats as shown in FIG. 45.

Figure 46:
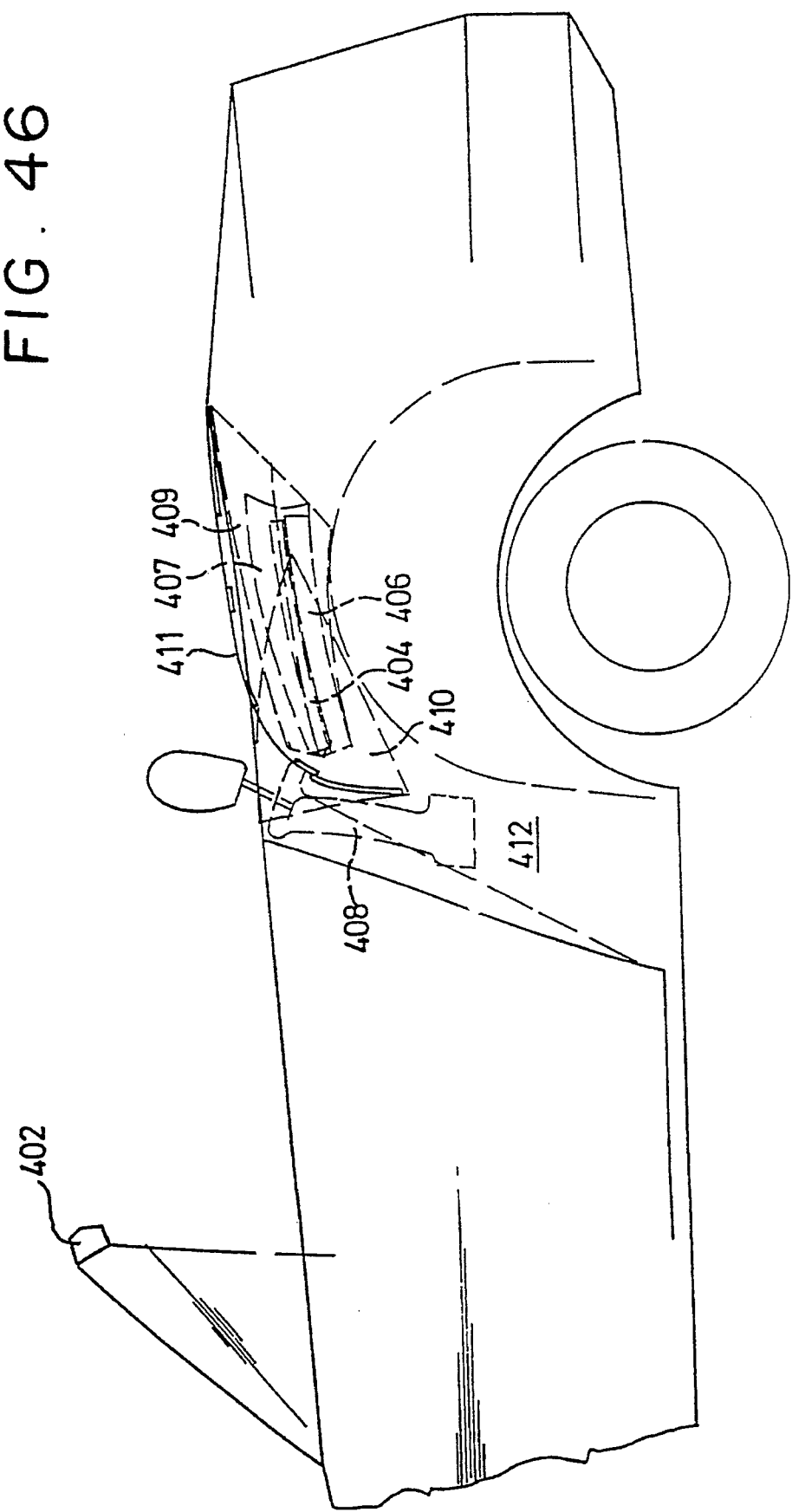
FIG. 46 shows the vehicle roof of FIG. 38 in a completely open position and with an extended covering.
Figure 47:
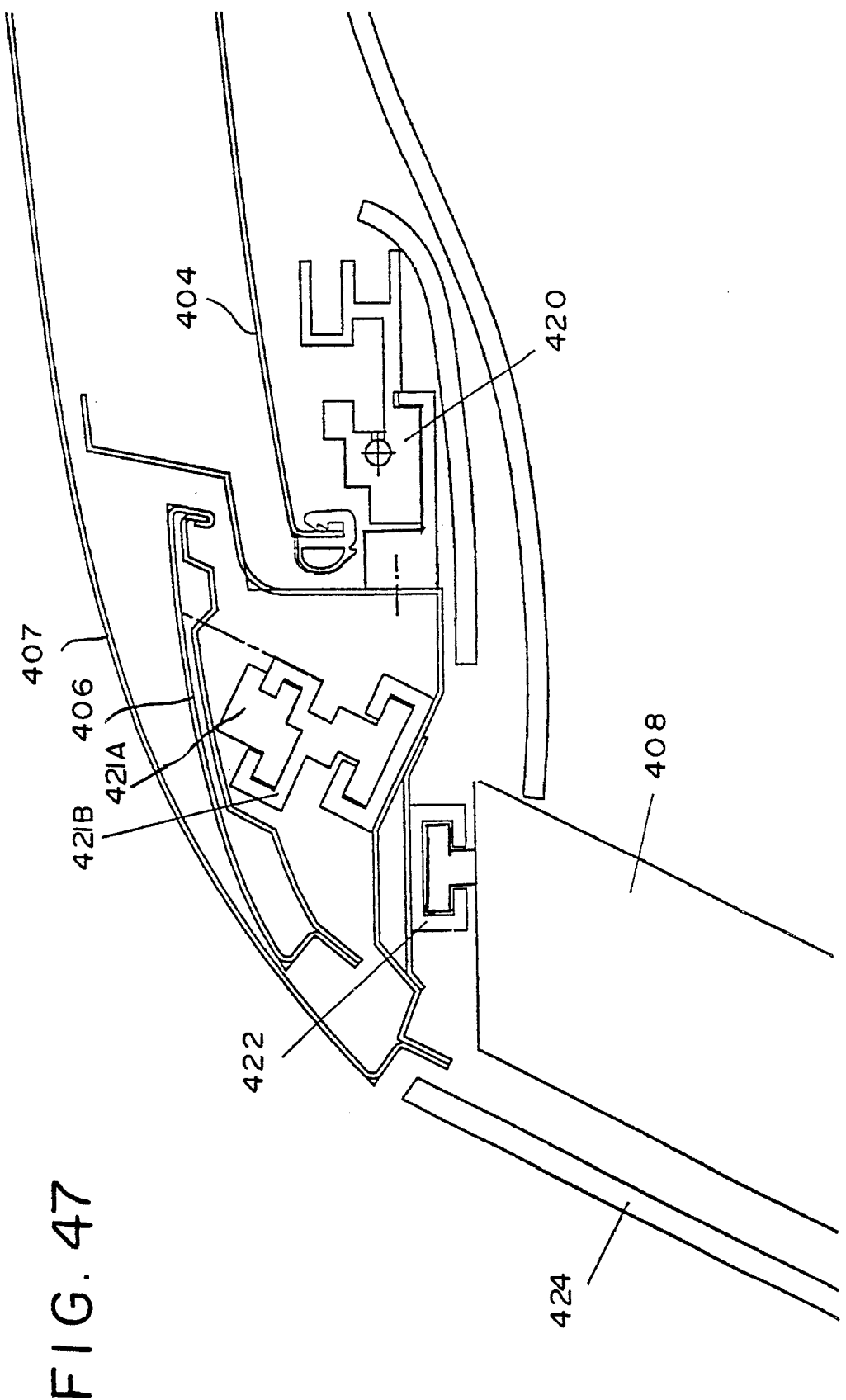
FIG. 47 is a sectional view along line 47—47 of FIG. 38 with the roof in the position shown in FIG. 41.
Figure 48:
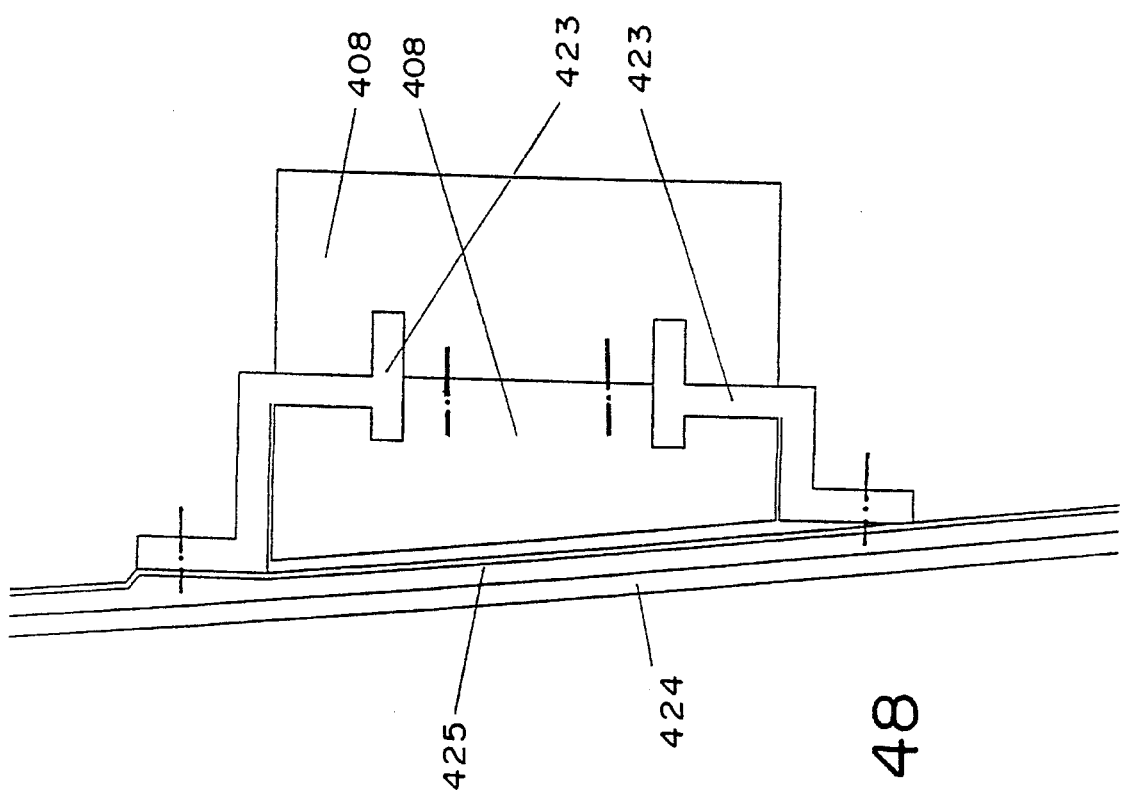
FIG. 48 is a sectional view along line 48—48 of FIG. 47.

In FIG. 46, it is shown, on the other hand, that in a modification this aspect of the invention, the package of rear window 409 and the rear roof part 407 lying below it have been lowered by an additional amount so that its front edge is within storage space 412. In this state, the covering 411 can be moved over this package to close storage space 412 from above. In the state shown in FIG. 46, the vehicle offers the outward appearance of a true full convertible. In this stage, only sturdily designed front transverse spar 402 is used in connection with the A-columns, not represented, as roll bar.

An easily convertible combination of a stationary vehicle roof with a sunroof and a convertible-type, completely lowerable folding top has been created by the vehicle roof described which is formed of vehicle roof parts including roof frame body parts (e.g., parts 62, 66, 68) and rigid roof panel body parts (e.g., wind deflector 63, cover 64 and rear roof part 67), at least one of said rigid roof panel body parts (i.e., cover 64) being slidably movable during vehicle travel, relative to other of said vehicle roof parts (62, 63 and 66–69) in longitudinal vehicle directions, along roof frame body parts (lateral roof parts 66) that are located at lateral sides of the vehicle roof, into at least one open position (sunroof mode, FIGS. 22, 23) in which an opening is formed in the roof that is at least partially bounded by said other vehicle roof parts (62, 63, 66 and 67); wherein first means (e.g., the pushing-pivoting mechanism of FIGS. 31–33 and drive 81) are provided for moving the vehicle roof frame body parts and rigid roof panel body parts from the sunroof mode open position into a compacted configuration (e.g., FIG. 34) in which the roof is substantially reduced in length and second means (e.g., drives 74 & 79 and drive cable 91) are provided for moving the vehicle roof frame body parts and rigid roof panel body parts into a stowage space (72a and 72b) located in a rear part of the vehicle, while in said compacted configuration, in a manner fully opening a passenger compartment of the vehicle in an upward direction (convertible mode of FIG. 37); and wherein said rigid roof panel body parts include parts (64, 67) which are substantially horizontally oriented in said closed position (FIG. 18) and which are positioned by said second means (79) within the stowage space (72b) in a substantially vertical orientation (FIG. 37).

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Vehicle roof formed of vehicle roof parts including roof frame body parts and rigid roof panel body parts, at least one of said rigid roof panel body parts being slidably movable, during vehicle travel, relative to other of said vehicle roof parts in longitudinal vehicle directions, along roof frame body parts that are located at lateral sides of the vehicle roof, into at least one open position in which an opening is formed in the roof that is at least partially bounded by said other vehicle roof parts; wherein first means are provided for moving the vehicle roof frame body parts and rigid roof panel body parts from said at least one open position into a compacted configuration in which the roof is substantially reduced in length and second means are provided for moving the vehicle roof frame body parts and rigid roof panel body parts into a stowage space located in a rear part of the vehicle, while in said compacted configuration, in a manner fully opening a passenger compartment of the vehicle in an upward direction; and wherein said rigid roof panel body parts include parts which are substantially horizontally oriented in said closed position and which are positioned by said second means within the stowage space in a substantially vertical orientation.

2. Vehicle roof according to claim 1, wherein the at least one of the rigid roof panel body parts that is openable comprises two covers of a sliding roof.

3. Vehicle roof according to claim 1, wherein the other vehicle roof parts comprise a rear roof part which, together with side, supporting pillars forms a roll bar.

4. Vehicle roof according claim 3, wherein the rear roof part is constructed to receive the at least one rigid roof panel body part which is slidably movable when said at least one rigid roof panel body part is opened.

5. Vehicle roof according to claim 4, wherein a rear window is provided which is mounted for displacement relative to the rear roof part.

6. Vehicle roof according to claim 5, wherein said second means comprises a first mechanism for moving the at least one rigid roof panel body part which is slidably movable, said roof frame body parts and said rigid roof panel body parts into said stowage space and a separate mechanism for lowering the rear window into said stowage space.

7. Vehicle roof according to claim 5, wherein said roof frame body parts are detachably fastened by a coupling mechanism to a transverse support which runs above a front windshield of the vehicle.

8. Vehicle roof according to claim 1, wherein said roof frame body parts are detachably fastened by a coupling mechanism to a transverse support which runs above a front windshield of the vehicle.

9. Vehicle roof according to claim 8, wherein said first means includes means for pivoting the roof frame body parts at the lateral sides of the vehicle roof against a rear roof part after movement of said at least one openable roof panel body part into a fully retracted position.

10. Vehicle roof according to claim 9, wherein the other vehicle roof parts comprise said rear roof part and supporting pillars which form a roll bar together with the rear roof part.

11. Vehicle roof according to claim 10, wherein the rear roof part is constructed to receive the at least one rigid roof panel body part which is slidably movable, when said at least one rigid roof panel body part is opened.

12. Vehicle roof according claim 11, wherein a rear window is provided which is mounted for displacement relative to the rear roof part.

13. Vehicle roof according to claim 12, wherein said second means comprises a first mechanism for swinging the at least one openable roof part and the other of said body parts into said stowage space; and a separate mechanism for lowering the rear window into said stowage space.

14. Vehicle roof according to claim 13, wherein the stowage space has a movable cover which is mounted for movement by a servomotor in an opening direction before lowering of the rear window into the stowage space and in a closing direction after swinging of the rear roof part into the stowage space.

15. Vehicle roof according to claim 6, wherein said second movement means includes means for swinging the rear roof part into the stowage space, together with the at least one openable roof panel body part and supporting pillars, after lowering the rear window into the stowage space.

16. Vehicle roof according to claim 6, wherein said second movement means includes means for separately moving the at least one openable roof panel body part into the stowage space after the rear window has been lowered therein.

17. Vehicle roof according to claim 1, wherein the at least one rigid roof panel body part which is slidably movable is a cover of a sliding-lifting roof.

18. Vehicle roof according to claim 3, wherein the substantially horizontally oriented rigid roof panel body parts are mounted so as to be movable relative to the supporting pillars.

19. Vehicle roof according to claim 18, wherein the substantially horizontally oriented rigid roof panel body parts are mounted to be movable relative to the supporting pillars.

20. Vehicle roof according to claim 18, wherein the substantially horizontally oriented rigid roof panel body parts are mounted to be pivotally movable relative to the supporting pillars.

21. Vehicle roof formed of vehicle roof parts including roof frame body parts and rigid roof panel body parts, at least one of said rigid roof panel body parts being slidably movable, during vehicle travel, relative to other of said vehicle roof parts in longitudinal vehicle directions, along a lateral one of said roof frame body parts located at each of lateral sides of the vehicle roof, into partial and fully open positions in which an opening is formed in the roof that is at least partially bounded by said other of said vehicle roof parts, said other of said vehicle roof parts remaining stationary during the sliding movement of said at least one of said rigid roof panel parts which is slidably movable roof part; wherein the roof frame body parts at the lateral sides of the vehicle roof are connected to a rear roof part and to a transverse support which runs above a front windshield of the vehicle at least when said at least one of the rigid roof panel body parts is moved during vehicle travel and being disengageable from said transverse support when said at least one of the rigid roof panel body parts is in said fully open position; and wherein first means are provided for moving the vehicle roof frame body parts and roof panel body parts from said fully open position into a compacted configuration in which the roof is substantially reduced in length and second means are provided for moving the vehicle roof frame body parts and the roof panel body parts into a stowage space located in a rear part of the vehicle, while in said compacted configuration, in a manner fully opening a passenger compartment of the vehicle in an upward direction, when the roof frame body parts at the lateral sides of the vehicle roof are disengaged from said transverse support.

22. Vehicle roof according to claim 21, wherein said first means comprises means for enabling the roof frame body parts at the lateral sides of the vehicle roof to be telescopically retracted into the rear roof part when said at least one of the roof panel body parts is in said fully open position.

23. A vehicle roof with at least one rigid roof cover part that can be opened during driving in a sunroof mode by being moved into at least one open position, in a lengthwise direction of the vehicle and relative to rigid roof parts lying laterally and to the rear with respect to said at least one roof cover part, said rigid roof parts including a rear roof part that is attached to lateral roof parts, said lateral roof parts and said rear roof part being fixed relative to a body portion of the vehicle at least in said sunroof mode, and means for fury opening the roof to provide a convertible-type roof opening by moving of all of the rigid roof parts and the at least one roof cover part into a storage space in a rear part of the vehicle; wherein the lateral roof parts are attached to the rear roof part by means for displacing the lateral roof parts with respect to the rear roof part while attached thereto, after moving of the roof cover part into a completely open position, for reducing the length of said roof prior to moving thereof into said storage space.

24. Vehicle roof according to claim 23, wherein a forward end of said roof cover part is rearwardly displaceable beyond a forward end of said rear roof part; wherein said means for enabling comprises a pivotable connection between said lateral roof parts and said rear roof part; and wherein means are provided for pivoting said lateral roof parts from a position extending in said lengthwise direction of the vehicle into a position extending parallel to the forward end of said rear roof part.

25. Vehicle roof according to claim 23, wherein said roof cover part is rearwardly displaceable into said rear roof part; wherein said means for displacing comprises a slidable connection between said lateral roof parts and said rear roof part; and wherein means are provided for sliding said lateral roof parts from a position extending forwardly from a front end of the rear roof part into a retracted position within said rear roof part laterally outwardly of said roof cover part.

26. Vehicle roof according to claim 25, wherein means for retracting the rear roof part under a rear window are provided.

27. Vehicle roof according to claim 26, wherein said means for retracting includes means for raising the rear window before retraction of the rear roof part thereunder.

28. Vehicle roof according claim 27, wherein the rear roof part is supported on B-columns; and wherein said B-columns are provided with means for lowering thereof to a position within the storage space located in front of a rear axle of the vehicle.

29. Vehicle roof according to claim 28, wherein the rear window is lowerable into a position covering the storage space after the B-columns have been lowered.

30. Vehicle roof according claim 25, wherein the rear roof part is supported on B-columns; and wherein said B-columns are provided with means for lowering thereof to a position within the storage space located in front of a rear axle of the vehicle.

31. Vehicle roof according to claim 30, wherein a rear window is lowerable into a position covering the storage space after the B-columns have been lowered.

32. Vehicle roof according to claim 28, wherein the rear window is lowerable into a position covering the storage space after lowering of the roof therein.

* * * * *